United States Patent
Castorina et al.

(10) Patent No.: US 10,105,942 B2
(45) Date of Patent: *Oct. 23, 2018

(54) SYSTEMS AND METHODS FOR FORMING RADIUS FILLERS FOR COMPOSITE STRUCTURES

(71) Applicant: The Boeing Company, Chicago, IL (US)

(72) Inventors: Elise Rae Ermitano Castorina, Shoreline, WA (US); Erik Lund, Issaquah, WA (US); Nicholas A. Boroughs, Seattle, WA (US); Matt Christner, Seattle, WA (US); Gabriel Zane Forston, Lake Stevens, WA (US); William Thomas Kline, Burien, WA (US); Thomas Dean Wilson, Auburn, WA (US); Bruno Zbinden, Lake Tapps, WA (US); Dalton C. Bergan, Seattle, WA (US); Joseph Fount Warren, Jr., Maple Valley, WA (US); Scott Edward Krajca, Seattle, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/615,453

(22) Filed: Jun. 6, 2017

(65) Prior Publication Data

US 2017/0266942 A1 Sep. 21, 2017

Related U.S. Application Data

(60) Continuation-in-part of application No. 15/486,149, filed on Apr. 12, 2017, which is a division of
(Continued)

(51) Int. Cl.
*B23B 41/00* (2006.01)
*B32B 38/18* (2006.01)
(Continued)

(52) U.S. Cl.
CPC .......... *B32B 38/1808* (2013.01); *B29C 70/34* (2013.01); *B29C 70/386* (2013.01);
(Continued)

(58) Field of Classification Search
CPC ............... B32B 38/1808; B29C 65/02; H01L 21/67132; A61F 2013/0296; A61J 3/00; A61K 9/2072
(Continued)

(56) References Cited

U.S. PATENT DOCUMENTS 4,113,910 A 9/1978 Loyd
4,440,593 A 4/1984 Goldsworthy
(Continued)

FOREIGN PATENT DOCUMENTS

CN 101959674 1/2011
EP 2610165 7/2013
(Continued)

OTHER PUBLICATIONS

Machine generated English language translation of abstract for JP 2013-530855, downloaded from Espacenet.com on Jun. 22, 2017.
(Continued)

*Primary Examiner* — Michael N Orlando
*Assistant Examiner* — Joshel Rivera
(74) *Attorney, Agent, or Firm* — DASCENZO Intellectual Property Law, P.C.

(57) ABSTRACT

Systems and methods for forming radius fillers for composite structures are disclosed herein. The systems include a sheet-locating structure that has a support surface and a support surface edge. The systems further include a sepa-
(Continued)

ration device, a conveyance structure, and a layup surface. The methods include locating a sheet of composite material on a first support surface and translating the sheet of composite material such that a first portion of the sheet is supported by the first support surface and a second portion of the sheet extends past the support surface edge. The methods also include separating the second portion of the sheet from the first portion of the sheet to form a strip of composite material. The methods further include conveying the strip of composite material onto a layup surface and repeating the methods to form the radius filler from a plurality of strips of composite material.

20 Claims, 11 Drawing Sheets

Related U.S. Application Data application No. 14/464,467, filed on Aug. 20, 2014, now Pat. No. 9,643,395.

(51) Int. Cl.
| | |
|---|---|
| B32B 43/00 | (2006.01) |
| B32B 27/38 | (2006.01) |
| B32B 27/18 | (2006.01) |
| B32B 27/12 | (2006.01) |
| B32B 27/08 | (2006.01) |
| B32B 7/04 | (2006.01) |
| B32B 5/26 | (2006.01) |
| B32B 5/12 | (2006.01) |
| B32B 3/18 | (2006.01) |
| B29C 70/34 | (2006.01) |
| B29C 70/38 | (2006.01) |
| B29C 70/54 | (2006.01) |
| B32B 38/10 | (2006.01) |
| B29L 31/30 | (2006.01) |
| B29K 105/08 | (2006.01) |

(52) U.S. Cl.
CPC .............. *B29C 70/545* (2013.01); *B32B 3/18* (2013.01); *B32B 5/12* (2013.01); *B32B 5/26* (2013.01); *B32B 7/045* (2013.01); *B32B 27/08* (2013.01); *B32B 27/12* (2013.01); *B32B 27/18* (2013.01); *B32B 27/38* (2013.01); *B32B 43/00* (2013.01); *B29K 2105/0872* (2013.01); *B29L 2031/3076* (2013.01); *B32B 38/10* (2013.01); *B32B 2260/021* (2013.01); *B32B 2260/046* (2013.01); *B32B 2262/101* (2013.01); *B32B 2262/103* (2013.01); *B32B 2262/106* (2013.01); *B32B 2307/50* (2013.01); *B32B 2605/08* (2013.01); *B32B 2605/18* (2013.01)

(58) Field of Classification Search
USPC ......... 156/64, 350, 360, 363, 364, 366, 367, 156/378, 379
See application file for complete search history.

(56) References Cited

U.S. PATENT DOCUMENTS

| | | | |
|---|---|---|---|
| 4,559,005 | A | 12/1985 | Gants et al. |
| 4,789,594 | A | 12/1988 | Stawski |
| 4,919,739 | A | 4/1990 | Dyksterhouse et al. |
| 5,026,447 | A | 6/1991 | O'Connor |
| 5,192,383 | A | 3/1993 | Cavin |
| 5,268,050 | A | 12/1993 | Azari |
| 5,556,496 | A | 9/1996 | Sumerak |
| 5,639,535 | A | 6/1997 | McCarville |
| 5,948,472 | A | 9/1999 | Lawrie |
| 6,500,370 | B1 | 12/2002 | Belvin et al. |
| 6,562,436 | B2 | 5/2003 | George et al. |
| 6,689,448 | B2 | 2/2004 | George et al. |
| 6,709,538 | B2 | 3/2004 | George et al. |
| 6,800,164 | B2 | 10/2004 | Brandstrom |
| 7,534,319 | B2 | 5/2009 | Mead et al. |
| 7,901,762 | B2 | 3/2011 | Brown et al. |
| 7,987,885 | B2 | 8/2011 | Zhou et al. |
| 8,101,107 | B2 | 1/2012 | Brown et al. |
| 8,211,530 | B2 | 7/2012 | Mead et al. |
| 8,591,685 | B2 | 11/2013 | Anderson et al. |
| 8,815,036 | B2 | 8/2014 | Nitsch |
| 9,073,272 | B2 | 7/2015 | Blot et al. |
| 9,102,103 | B2 | 8/2015 | Fox et al. |
| 9,616,594 | B2 | 4/2017 | Guzman et al. |
| 9,643,395 | B2 | 5/2017 | Kline et al. |
| 2005/0048273 | A1 | 3/2005 | Ryan |
| 2008/0053599 | A1 | 3/2008 | Aijima |
| 2013/0149521 | A1 | 6/2013 | Nelson et al. |
| 2015/0283764 | A1 | 10/2015 | McCarville et al. |
| 2017/0217110 | A1* | 8/2017 | Kline .................. B29C 70/386 |

FOREIGN PATENT DOCUMENTS

| | | |
|---|---|---|
| JP | S 48-23154 | 7/1973 |
| JP | H 01-208147 | 8/1989 |
| JP | 04-299110 | 10/1992 |
| JP | 2013-530855 | 8/2013 |
| RU | 2415750 | 4/2010 |
| WO | WO 0162495 | 8/2001 |
| WO | WO 2011/001080 | 1/2011 |

OTHER PUBLICATIONS

Machine generated English language translation of abstract for JPH 01-208147, downloaded from Espacenet.com on Jun. 22, 2017.
Machine generated English language translation of abstract for JPS 48-23154, downloaded from Espacenet.com on Jun. 22, 2017.
Machine generated English translation of abstract for RU 2415750 downloaded from Espacenet.com on May 31, 2017.
Machine generated English translation of abstract for CN 101959674 downloaded from Espacenet.com on Apr. 22, 2016.
English translation of abstract for JP 04-299110.
Machine generated English translation of abstract for WO 2011/001080 downloaded from Espacenet.com on Apr. 22, 2016.
Remi Blanc et al., "Fiber orientation measurements in composite materials," 37 (2) Compos. Part A Appl. Sci. Manuf., 197-206 (2006).

* cited by examiner

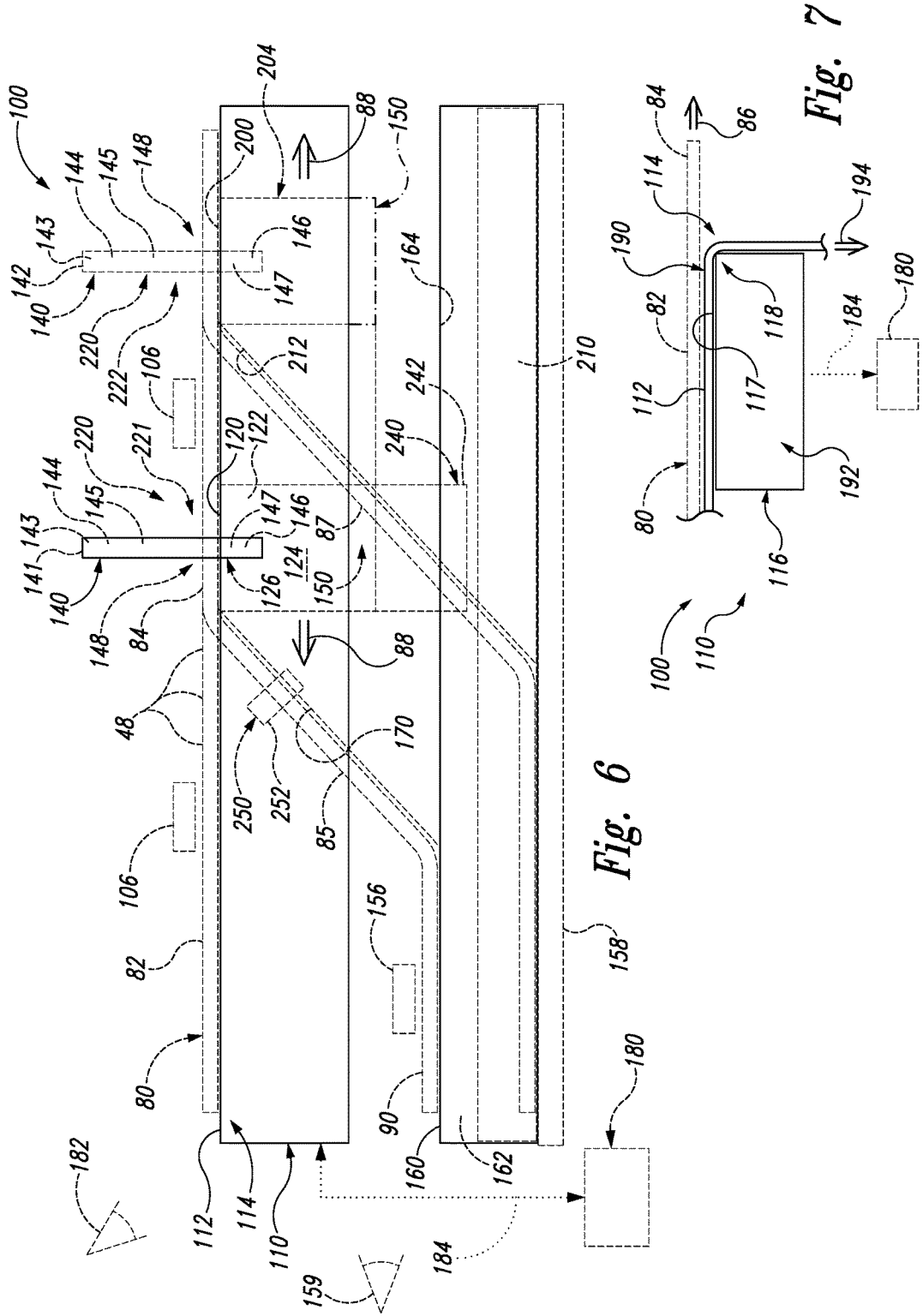

SYSTEMS AND METHODS FOR FORMING RADIUS FILLERS FOR COMPOSITE STRUCTURES

RELATED APPLICATIONS

This application is a continuation-in-part of and claims priority under 35 USC 120 to U.S. patent application Ser. No. 15/486,149, entitled "METHODS FOR FORMING RADIUS FILLERS FOR COMPOSITE STRUCTURES," filed on Apr. 12, 2017, which is a divisional of and claims priority to U.S. patent application Ser. No. 14/464,467, entitled "SYSTEMS AND METHODS FOR FORMING RADIUS FILLERS FOR COMPOSITE STRUCTURES," filed on Aug. 20, 2014 and issued as U.S. Pat. No. 9,643,395 on May 9, 2017, the complete disclosures of which are hereby incorporated by reference.

FIELD

The present disclosure relates to systems and methods for forming radius fillers for composite structures.

BACKGROUND

Composite structures often include a laminate structure in which sheets of a composite material, such as a pre-impregnated (or prepreg) material, may be bent, wrapped, and/or otherwise extended between a first plane, or surface, and a second plane, or surface. The finite thickness and/or mechanical stiffness of the sheets of composite material result in a finite bend, or radius of curvature, in a transition region between the first surface and the second surface; and, in some geometries, this finite radius of curvature results in a void space, or cavity, between adjacent sheets of composite material.

This void space may be filled with, or otherwise occupied by, a filler material, such as a radius filler. The radius filler may be configured to provide mechanical support to the sheets of composite material that are proximal thereto and/or to decrease a potential for distortion of the sheets of composite material while the composite structure is curing. Thus, it may be desirable to closely match the shape of the radius filler to a shape, or a desired shape, of the void space.

Traditional radius fillers often utilize a single length of composite material that may be creased in a number of locations to form an accordion shape and then molded to a final desired shape. Alternatively, the traditional radius fillers may utilize a plurality of lengths of composite material that are manually stacked, one on top of the other, to form a plurality of parallel planes of composite material. These approaches may not permit tight control of the shape of the radius filler and/or may be labor-intensive. Thus, there exists a need for improved systems and methods for forming radius fillers for composite structures.

SUMMARY

Systems and methods for forming radius fillers for composite structures are disclosed herein. The systems include a sheet-locating structure that has a first support surface and a support surface edge. The first support surface is configured to support a first portion of a sheet of a composite material and the sheet-locating structure is configured to selectively extend a second portion of the sheet of composite material past the support surface edge.

The systems also include a separation device. The separation device is configured to separate the second portion of the sheet of composite material from the first portion of the sheet of composite material to form a strip of composite material.

The systems also include a conveyance structure. The conveyance structure is configured to operatively translate the separation device along the support surface edge to form the strip of composite material.

The systems further include a layup surface. The layup surface is configured to receive the strip of composite material subsequent to the strip of composite material being separated from the sheet of composite material.

The methods include locating a sheet of composite material on a first support surface and translating the sheet of composite material such that a first portion of the sheet is supported by the first support surface and a second portion of the sheet extends past the support surface edge. The methods also include separating the second portion of the sheet of composite material from the first portion of the sheet of composite material to form a strip of composite material. The methods further include conveying the strip of composite material onto a layup surface concurrently with the separating and also include repeating at least a portion of the methods to sequentially locate a plurality of strips of composite material on the layup surface to form a stack of strips of composite material that defines the radius filler.

BRIEF DESCRIPTION OF THE DRAWINGS

FIG. 6 is a schematic side view of the systems of FIG. 5

FIG. 7 is a schematic end view of a more detailed but still illustrative, non-exclusive example of a sheet-locating structure, according to the present disclosure, that may form a portion of and/or may be utilized with the system of FIGS. 3-7.

DESCRIPTION

Figure 1:
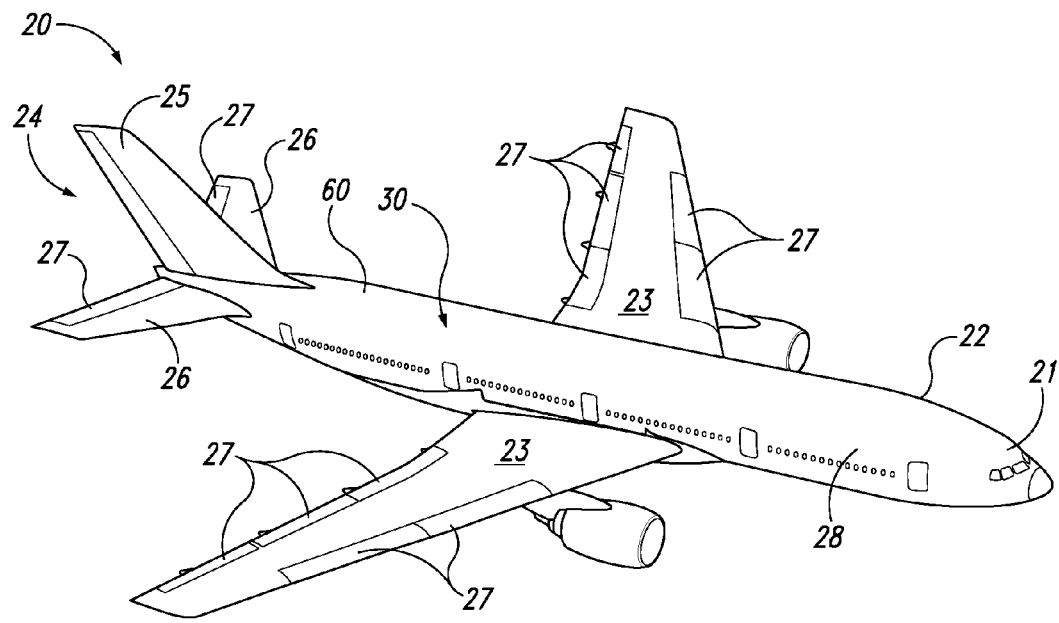
FIG. 1 is a schematic representation of an illustrative, non-exclusive example of an aircraft that may include and/or utilize radius fillers formed utilizing the systems and methods according to the present disclosure.

FIGS. 1-13 provide examples of radius fillers 60, of composite structures 30 that include radius fillers 60, and/or of systems 100 and methods 400 of manufacturing the radius fillers. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a schematic representation of an illustrative, non-exclusive example of an aircraft 20 that may include one or more composite structures 30. Composite structures 30 may include and/or utilize radius fillers 60 according to the present disclosure. Composite structures 30 may form any suitable portion of aircraft 20. As illustrative, non-exclusive examples, composite structures 30 may form any suitable portion of a cockpit 21, a fuselage 22, wings 23, a tail 24, a vertical stabilizer 25, horizontal stabilizers 26, control surfaces 27, and/or an interior 28 of aircraft 20.

Figure 2:
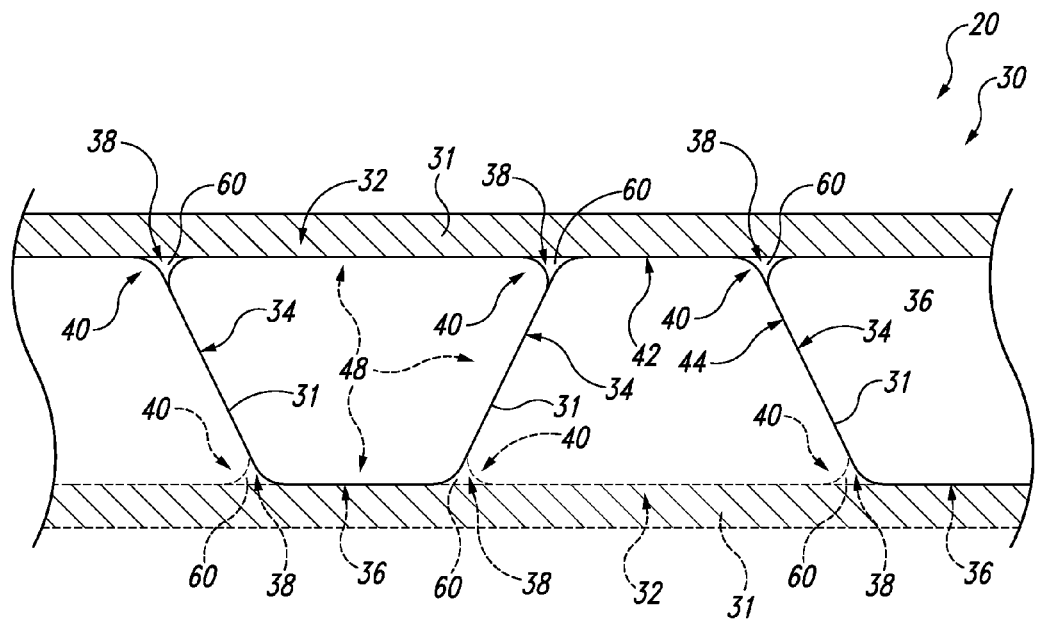
FIG. 2 is a schematic cross-sectional view of a composite structure that may include radius fillers formed utilizing the systems and methods according to the present disclosure.

Similarly, composite structures 30 may include any suitable form, an illustrative, non-exclusive example of which is shown in FIG. 2. The composite structure of FIG. 2 includes a skin 32 and a plurality of webs 34, each of which may be formed from one or more sheets, plies, and/or layups 48 of composite material 31. Composite structures 30 may include a single skin 32, with a plurality of hat stiffeners 36 that are formed from webs 34. Alternatively, and as illustrated in dashed lines in FIG. 2, composite structures 30 also may include two skins 32, with webs 34 extending therebetween.

Regardless of the specific construction of composite structures 30, skins 32 and/or webs 34 may define voids 38, which also may be referred to herein as elongate voids 38, as void spaces 38, and/or as elongate void spaces 38. Voids 38 may be defined within a transition region 40 between skins 32 and webs 34 and/or in any suitable transition region 40 between a first plane, or surface, 42 and a second plane, or surface, 44 of composite structure 30. Voids 38 may be filled with, or otherwise occupied by, a radius filler 60, which may extend therein; and a shape and/or one or more material properties of radius filler 60 may impact a shape and/or one or more material properties of composite structures 30.

Figure 3:
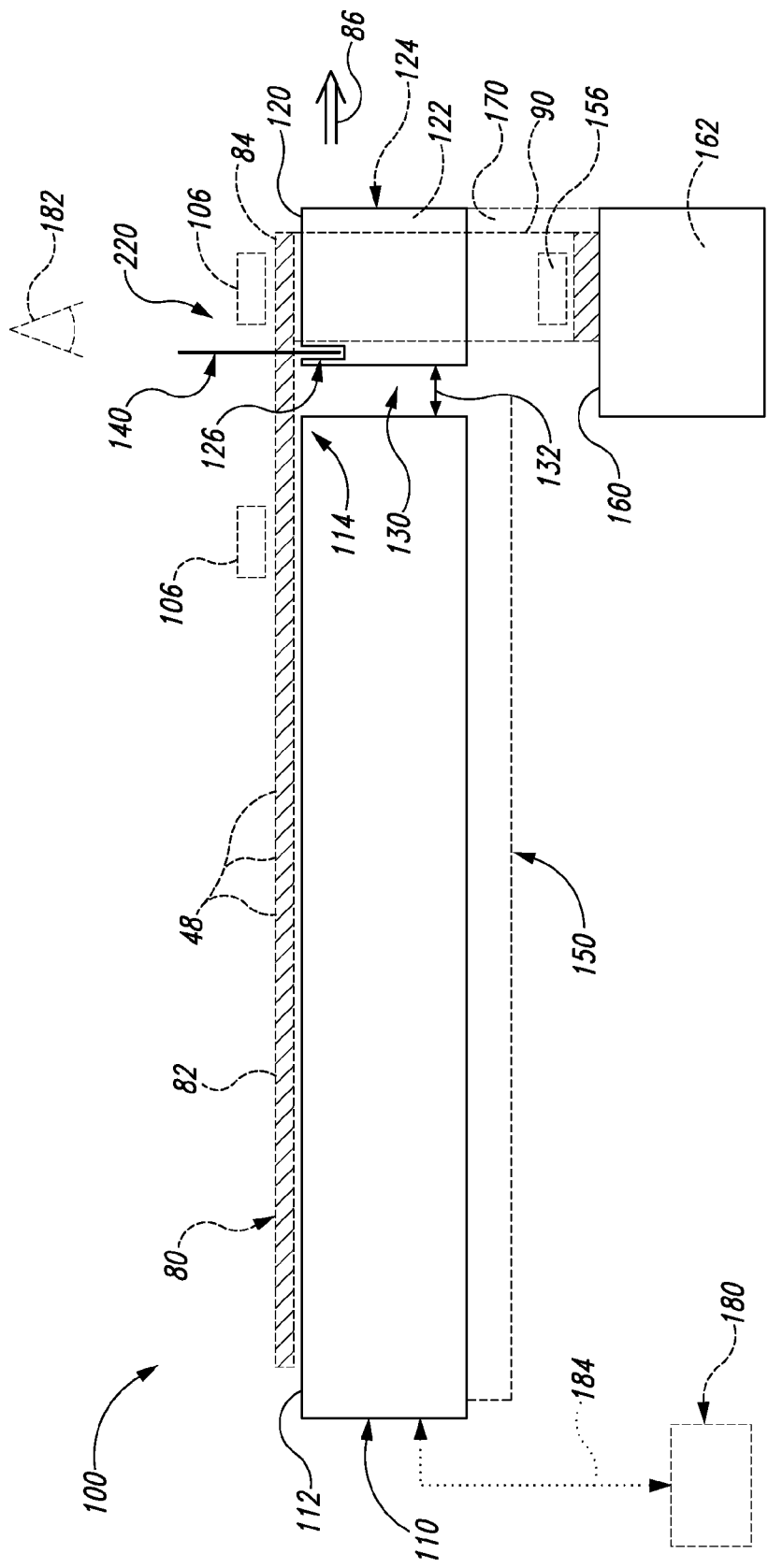
FIG. 3 is a schematic end view of systems, according to the present disclosure, for forming a radius filler for a composite structure.
Figure 4:
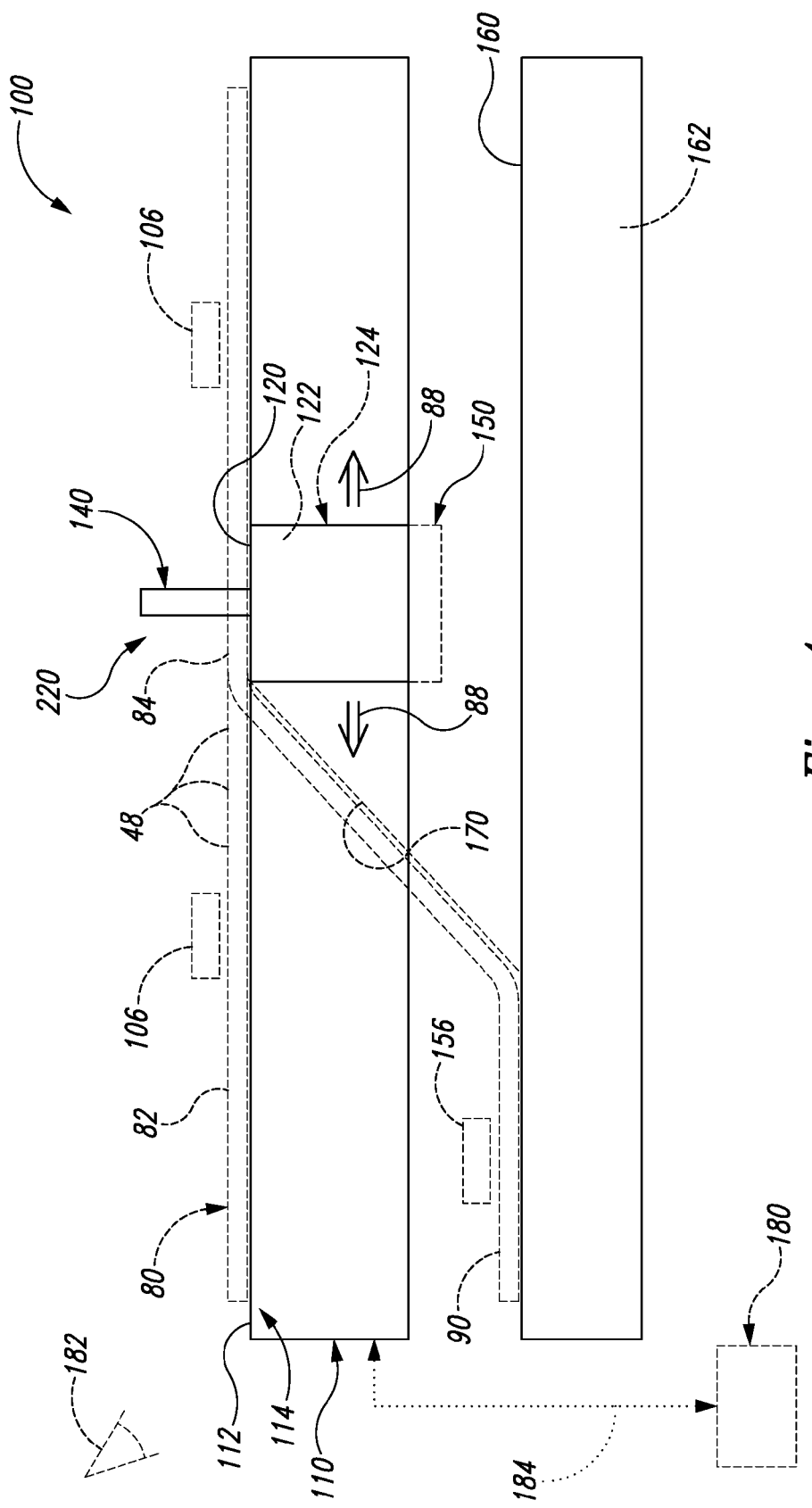
FIG. 4 is a schematic side view of the systems of FIG. 3.
Figure 5:
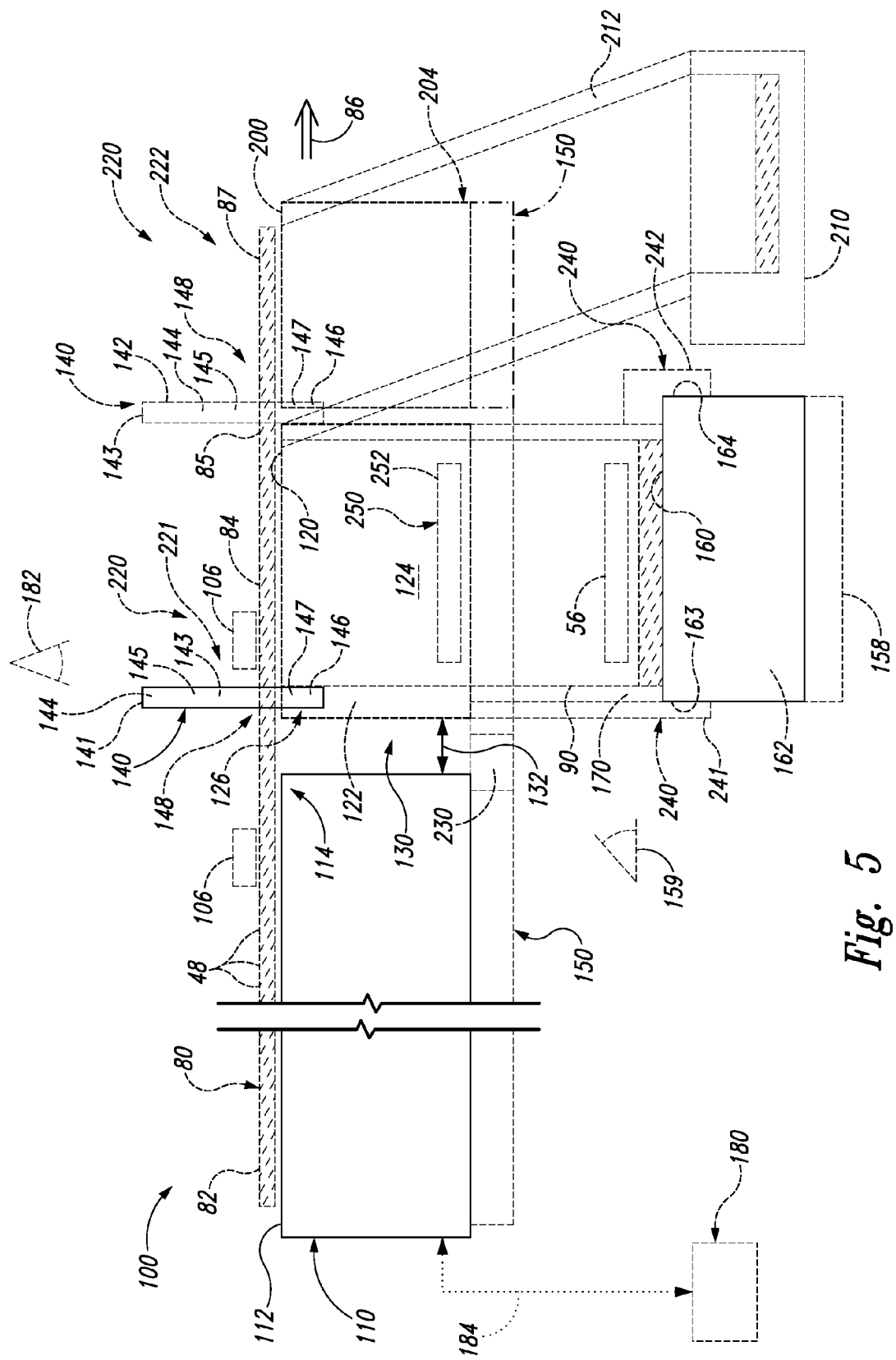
FIG. 5 is a schematic end view of additional systems, according to the present disclosure, for forming a radius filler for a composite structure.

FIG. 3 is a schematic end view of systems 100, according to the present disclosure, for forming a radius filler for a composite structure (such as radius filler 60 of FIGS. 1-2), and FIG. 4 is a schematic side view of systems 100 of FIG. 3. FIG. 5 is a schematic end view of additional systems 100, according to the present disclosure, for forming a radius filler for a composite structure, and FIG. 6 is a schematic side view of systems 100 of FIG. 5.

Systems 100 of FIGS. 3-6 include a sheet-locating structure 110 that has, or defines, a support surface 112, which also may be referred to herein as a first support surface 112. First support surface 112 is shaped, sized, located, designed, adapted, and/or configured to support a first portion 82 of a sheet 80 of composite material. First support surface 112 has a support surface edge 114. During operation of systems 100, sheet-locating structure 110 is configured to selectively and/or repeatedly extend, or cantilever, a second portion 84 of sheet 80 past, over, and/or across support surface edge 114 to permit separation of second portion 84 from first portion 82, as discussed in more detail herein.

Systems 100 also include a second support surface 120 that is adjacent first support surface 112 and/or support surface edge 114. As illustrated most clearly in FIGS. 3 and 5, first support surface 112 and second support surface 120 may define a gap 130 therebetween. Sheet-locating structure 110 is configured to selectively extend second portion 84 of sheet 80 across gap 130 and/or onto second support surface 120. Second support surface 120 is shaped, sized, located, designed, adapted, and/or configured to selectively support at least a fraction of second portion 84 of sheet 80 when second portion 84 extends past support surface edge 114.

Systems 100 further include a separation device 140. Separation device 140 is configured to separate second portion 84 of sheet 80 (or at least a portion thereof) from sheet 80 and/or from first portion 82 of sheet 80. This separation may form, define, or create a strip 90 of composite material. Strip 90 may be utilized to form (or form a portion of) a radius filler, as discussed in more detail herein.

Systems 100 also include a conveyance structure 150. Conveyance structure 150 may be adapted, designed, and/or configured to operatively translate second support surface 120 and separation device 140 along support surface edge 114. This operative translation may permit separation device 140 to cut through, or slit, sheet 80, thereby forming strip 90 of composite material.

Systems 100 further include a layup surface 160. Layup surface 160 may be shaped, sized, located, designed, adapted, and/or configured to receive strip 90 from second support surface 120 subsequent to strip 90 being separated, or cut, from sheet 80.

As illustrated in dashed lines in FIGS. 3-6, systems 100 also may include a controller 180 and/or a detection structure 182. Controller 180 may be adapted, configured, and/or programmed to automatically control the operation of at least a portion of systems 100, as discussed in more detail herein. Detection structure 182 may be adapted or configured to detect one or more properties of systems 100, as discussed in more detail herein.

As also illustrated in dashed lines in FIGS. 3-6, systems 100 may include one or more stabilizing rollers 106 and/or a compaction structure 156. Stabilizing rollers 106 may be configured to retain first portion 82 of sheet 80 (at least substantially) fixed relative to first support surface 112 during separation of strip 90 from sheet 80. Compaction structure 156 may be configured to compact strip 90 on layup surface 160.

As also illustrated in dashed lines in FIGS. 3-6 and perhaps illustrated most clearly in FIGS. 4 and 6, systems 100 further may include a transition surface 170. Transition surface 170 may extend (at least partially) from second support surface 120 to layup surface 160, may be configured to direct strip 90 from second support surface 120 onto layup surface 160, and/or may be configured to support strip 90 while strip 90 is conveyed from second support surface 120 onto layup surface 160. As illustrated, transition surface 170 may extend at a skew angle relative to second support surface 120 and/or relative to layup surface 160. In addition, transition surface 170 may be operatively coupled to second support surface 120 and/or to separation device 140 and/or may be configured to translate with second support surface 120 and/or with separation device 140, such as via operation of conveyance structure 150. The combination of transition surface 170, second support surface 120, and/or separation device 140 also may be referred to herein as a separation assembly 220.

Figure 13:
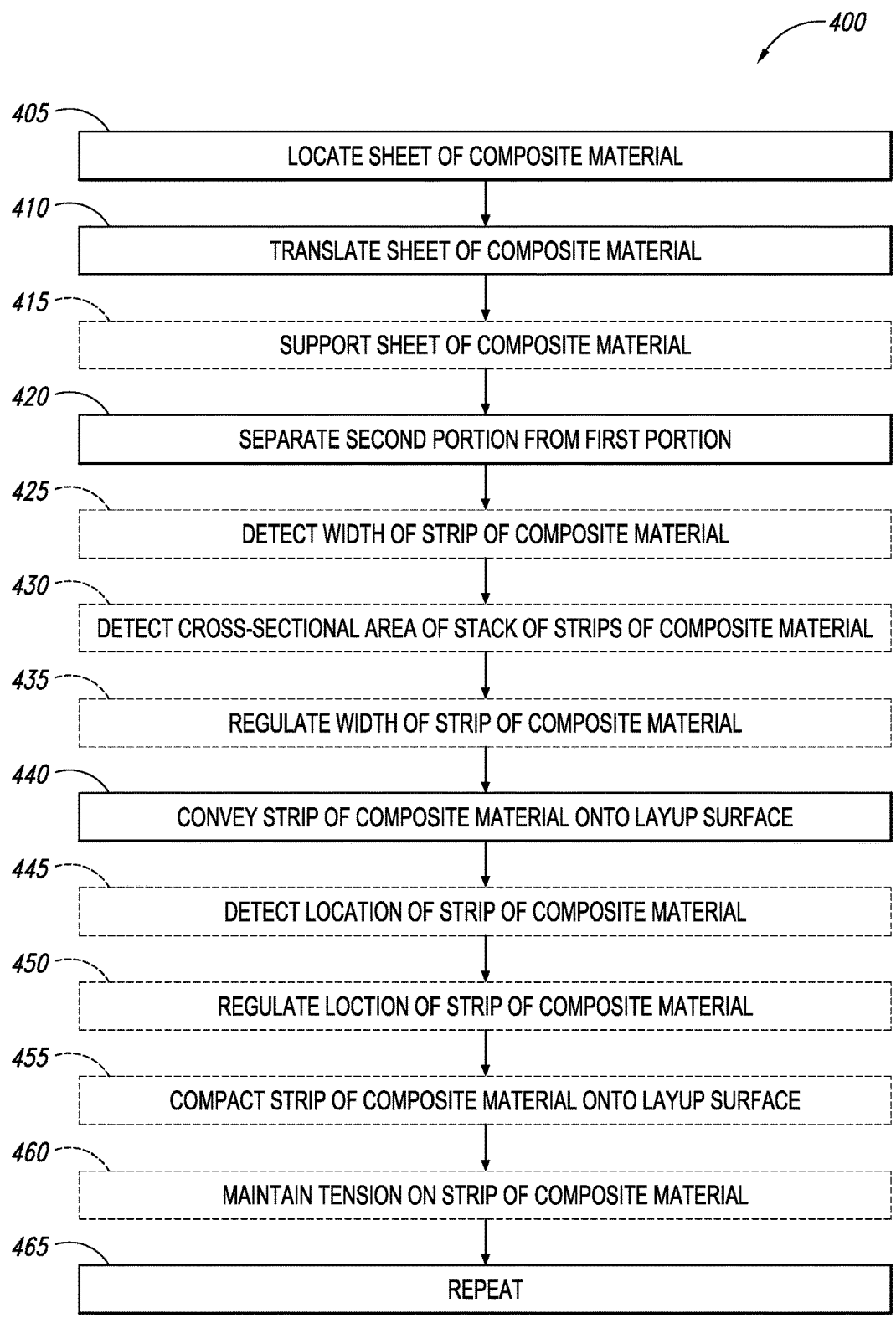
FIG. 13 is a flowchart depicting methods, according to the present disclosure, of forming a radius filler for a composite structure.

During operation of systems 100, and as discussed in more detail herein with reference to methods 400 of FIG. 13, sheet 80 may be located and/or placed on first support surface 112. Subsequently, sheet-locating structure 110 may be utilized to operatively translate second portion 84 of sheet 80 across support surface edge 114. This may include operative translation such that second portion 84 extends, or is cantilevered, past, support surface edge 114 and/or operative translation such that at least a fraction of second portion 84 is supported by second support surface 120. This is illustrated by arrow 86 in FIGS. 3 and 5.

Then, conveyance structure 150 may be utilized to operatively translate second support surface 120 and separation device 140 along support surface edge 114, thereby cutting, slicing, and/or otherwise separating second portion 84 from first portion 82 to form strip 90. This is illustrated in FIGS. 4 and 6 by arrows 88. Concurrently, strip 90 may be directed and/or conveyed onto layup surface 160 and compacted on layup surface 160 via compaction structure 156.

The above-described process may be repeated any suitable number of times to sequentially locate and compact a plurality of strips 90 on layup surface 160 to form a stack of strips of composite material that defines at least a portion of the radius filler. In addition, a width of each of the plurality of strips of composite material may progressively (or systematically) change, vary, and/or decrease within the stack of strips, thereby forming, or defining, a desired surface profile and/or cross-sectional shape for the radius filler. For example, the decrease in the width may be accomplished by progressively extending second portion 84 of sheet 80 a shorter (or different) distance past support surface edge 114 and is discussed in more detail herein with reference to FIGS. 12-13.

Returning to FIGS. 3-6, sheet-locating structure 110 may include any suitable structure that may define first support surface 112 and/or support surface edge 114 and/or that may be utilized to selectively extend second portion 84 of sheet 80 past support surface edge 114. In addition, sheet-locating structure 110 may include and/or be an electronically operated and/or controlled sheet-locating structure 110 that may be controlled in any suitable manner, such as via receipt of a control signal 184 from controller 180.

First support surface 112, second support surface 120, layup surface 160, transition surface 170, and/or any other structures that may contact sheet 80 and/or strip 90 may be formed from any suitable material. As illustrative, non-exclusive examples, first support surface 112, second support surface 120, layup surface 160, transition surface 170, and/or the other structures may be formed, or defined, by a material that is approved for contact with sheet 80, that will not damage sheet 80, and/or that will not contaminate sheet 80. Thus, sheet 80 may be in direct physical contact with first support surface 112, with second support surface 120, with layup surface 160, with transition surface 170, and/or with the other structures, and a backing paper may not extend (or may not be required to extend) between sheet 80 and first support surface 112.

Turning now more specifically to FIGS. 5-6, and as illustrated in dashed lines, systems 100 further may include a third support surface 200 that is spaced-apart from second support surface 120. When systems 100 include both second support surface 120 and third support surface 200, second support surface 120 may be configured to support a first fraction 85 of second portion 84 of sheet of composite material 80 and third support surface 200 may be configured to support a second fraction 87 of second portion 84. First support surface 112, second support surface 120, and third support surface 200 may be coplanar, or at least substantially coplanar.

A distance between first support surface 112 and second support surface 120 may be less than a distance between first support surface 112 and third support surface 200. As such first fraction 85 of second portion 84 may be proximal, or closer to, first support surface 112 relative to second fraction 87 of second portion 84. Stated another way, third support surface 200 may support a portion of sheet of composite material 80 (e.g., second fraction 87) that is distal first portion 82 relative to a portion of sheet of composite material 80 that is supported by second support surface 120 (e.g., first fraction 85).

When systems 100 include third support surface 200, separation device 140 may include and/or be a first separation device 141, and systems 100 further may include a second separation device 142. Second separation device 142 may be associated with, operatively attached, and/or configured to translate with, third support surface 200 and may be configured to separate second fraction 87 of second portion 84 of sheet of composite material 80 from first fraction 85. Under these conditions, first fraction 85 may form and/or define strip 90 of composite material, which may be conveyed to layup surface 160 and/or that may be utilized to at least partially form and/or define the radius filler. Examples of separation devices 140, including first separation device 141 and/or second separation device 142, are discussed in more detail herein.

When systems 100 include second separation device 142, systems 100 also may include a scrap bin 210. Scrap bin 210, when present, may be configured to receive second fraction 87 of second portion 82 of sheet of composite material 80 subsequent to separation of the second fraction from the first fraction. Stated another way, scrap bin 210 may be separate, distinct, and/or spaced-apart from layup surface 160 and may be utilized to maintain second fraction 87 separate, distinct, and/or spaced-apart from first faction 85 and/or from layup surface 160. As also illustrated in FIGS. 5-6, systems 100 may include a scrap transition surface 212 configured to direct second fraction 87 toward and/or into scrap bin 210. Scrap transition surface 212 may be operatively attached to third surface 200, may be configured to operatively translate with third support surface 200, and/or may extend at least partially between third support surface 200 and scrap bin 210.

Third support surface 200, second separation device 141, and/or scrap transition surface 212, when present, may be operatively coupled to one another and collectively may be referred to herein as a separation assembly 220 and/or as a second separation assembly 222 and may be configured to operatively translate together, such as via and/or utilizing conveyance structure 150. Under these conditions, first support surface 120, first separation device 141, and/or transition surface 170 also may be referred to herein as a first separation assembly 221.

FIGS. 5-6 illustrate, in dash-dot lines, a region of conveyance structure 150 that is operatively coupled to third support surface 200. This is to indicate that systems 100 may include separate and/or distinct conveyance structures 150 associated with second support surface 120, as illustrated in dashed lines, and third support surface 200, as illustrated in dash-dot lines. However, this is not required. As an example, second support surface 120, third support surface 200, first separation device 141, second separation device 142, transition surface 170, and/or scrap transition surface 212 may be operatively coupled together and/or may be configured to operatively and/or concurrently translate along support surface edge 114 via, or via a single, conveyance structure 150. As such, systems 100 may be configured to concurrently, or at least partially concurrently, form and/or define both first fraction 85 and second fraction 87.

During operation of systems 100 that include second support surface 120, third support surface 200, first separation device 41, and second separation device 42, sheet-locating structure 110 may extend second portion 84 of sheet of composite material 80 past support surface edge 114 such that second portion 84 is in contact with and/or is supported by both second support surface 120 and third support surface 200. Subsequently, separation assemblies 220, including first separation assembly 221 and second separation assembly 222 may be operatively translated along support surface edge 114 to concurrently form and/or define first fraction 85 and second fraction 87. First fraction 85 may be conveyed, such as via transition surface 170, as strip 90 and toward and/or onto layup surface 160 to form and/or define a portion of the charge of composite material. In contrast, second fraction 87 may be conveyed, such as via scrap transition surface 212, toward and/or into scrap bin 210. As such, systems 100 of FIGS. 5-6, which include both first separation assembly 221 and second separation assembly 222 may define both edges, or sides, of strip 90 in a single pass. This is in contrast to systems 100 of FIGS. 3-4, which generally will utilize two separate passes of a single separation assembly 220 to form and/or define both sides of strip 90. As such, systems 100 of FIGS. 5-6 may form strip 90 significantly more quickly (such as twice as fast) when compared to systems 100 of FIGS. 3-4.

FIG. 7 is a schematic end view of a more detailed but still illustrative, non-exclusive example of a sheet-locating structure 110, according to the present disclosure, that may form a portion of and/or may be utilized with systems 100 of FIGS. 3-6. As illustrated in FIG. 7, sheet-locating structure 110 may include a support table 116 that defines, or has, a table surface 117 and a table edge 118. A charge-advance belt 190 may extend across table surface 117 and across, over, and/or around table edge 118 and may have, or define, first support surface 112 and support surface edge 114. Charge-advance belt 190 also may be referred to herein as a conveyor belt 190 and may be formed from a material that is approved for contact with sheet 80 and/or that will not contaminate sheet 80, thereby permitting direct physical contact between charge-advance belt 190 and sheet 80.

Sheet-locating structure 110 further may include a charge-advance drive 192 that is configured to selectively and/or operatively translate charge-advance belt 190 relative to support table 116 and/or table surface 117 thereof. This is illustrated by arrow 194 in FIG. 7. This selective translation of charge-advance belt 190 may selectively and/or operatively extend second portion 84 of sheet 80 over and/or past support surface edge 114, as indicated by arrow 86 in FIG. 7. Charge-advance drive 192 may be an electronically controlled charge-advance drive 192 that may be controlled in any suitable manner, such as via receipt of control signal 184 from controller 180.

Returning to FIGS. 3-6, second support surface 120 may include and/or be defined by any suitable structure, such as a second support surface body 124 that may extend and/or be adjacent sheet-locating structure 110. Similarly, third support surface 200, when present, may include and/or be defined by any suitable structure, such as a third support surface body 204 that may extend and/or be adjacent second support surface 120.

As illustrated, first support surface 112, second support surface 120, and/or third support surface 200, when present, may be (at least substantially) coplanar with one another. Additionally or alternatively, first support surface 112, second support surface 120, and/or third support surface 200, when present, may be (at least substantially) parallel to one another. However, this is not required. As an illustrative, non-exclusive example, second support surface 120 may be located (slightly) vertically below first support surface 112. Additionally or alternatively, third support surface 200, when present, may be located (slightly) vertically below second support surface 120. Such an arrangement may permit sheet 80 to extend past support surface edge 114 and onto second support surface 120 and/or third support surface 200 without contacting an edge of second support surface body 124 and/or of third support surface body 204.

Second support surface 120 and/or third support surface 200, when present, may be shaped, sized, and/or configured to support a fraction of second portion 84 of sheet 80, with the fraction being less than an entire width of second portion 84. This is illustrated in FIGS. 4 and 6, where a width of second support surface 120 and/or of third support surface 200 is less than a width of first support surface 112, is less than a width of sheet 80, and/or is less than a length of strip 90 that may be formed from sheet 80.

It is within the scope of the present disclosure that second support surface 120 and/or third support surface 200 may be sized to support any suitable fraction of second portion 84 of sheet 80. As illustrative, non-exclusive examples, second support surface 120 and/or third support surface 200 may be sized to support less than 50%, less than 40%, less than 30%, less than 20%, less than 15%, less than 10%, less than 5%, less than 4%, less than 3%, less than 2%, and/or less than 1% of a surface area of second portion 84 of sheet 80. Second support surface 120 and/or third support surface 200 additionally or alternatively may be sized to support at least 0.1%, at least 0.5%, at least 1%, at least 2%, at least 3%, at least 4%, at least 5%, at least 6%, at least 7%, at least 8%, at least 9%, and/or at least 10% of the surface area of second portion 84 of sheet 80.

Gap 130, which is illustrated in FIGS. 3 and 5, may have, or define, any suitable width 132, or extent 132, between first support surface 112 and second support surface 120. As illustrative, non-exclusive examples, width 132 of gap 130 may be less than 10 millimeters (mm), less than 8 mm, less than 6 mm, less than 4 mm, less than 2 mm, or less than 1 mm. Width 132 of gap 130 additionally or alternatively may be at least 0.5 mm, at least 1 mm, at least 2 mm, at least 3 mm, or at least 4 mm.

Separation devices 140 may include, or be, any suitable structure that may be adapted, configured, designed, selected, and/or constructed to separate first portion 82 of sheet 80 from second portion 84 of sheet 80, to separate first fraction 85 of second portion 84 from second fraction 87 of second portion 84, and/or to form strip 90 from sheet 80 as a result of relative motion between separation devices 140 and sheet 80. As an illustrative, non-exclusive example, separation devices 140 may include a cutting device that is configured to cut sheet 80 and/or to create a slit within sheet 80. As additional illustrative, non-exclusive examples, and as illustrated schematically in FIGS. 5-6, separation devices 140 may include a knife, or an ultrasonic knife 143, a blade, a shear, a circular blade 144, and/or a cylindrical anvil 146. Separation devices 140 may be electronically controlled separation devices 140 that may be controlled in any suitable manner, such as via receipt of control signal 184 from controller 180.

As perhaps illustrated most clearly in FIG. 3, separation devices 140 may be sized and/or located to extend entirely through sheet 80 (or a thickness thereof) when separation device 140 is separating strip 90 from sheet 80. For example, separation devices 140 may extend from above sheet 80, first support surface 112, and/or second support surface 120 and into a recess 126 that may be formed within second support surface body 124. As another example, separation devices 140 may extend from within recess 126 and above sheet 80, first support surface 112, and/or second support surface 120. As yet another example, separation devices 140 may extend (at least partially) within recess 126. As another example, separation devices 140 may extend both above and below second support surface 120 and/or third support surface 200, when present.

Separation devices 140 may be operatively coupled to second support surface 120 and/or to third support surface 200, when present. Thus, separation devices 140 and second support surface 120 and/or third support surface 200 may be configured to translate together relative to first support surface 112, relative to sheet 80, and/or along support surface edge 114 due to the operation of conveyance structure 150, as discussed herein.

Conveyance structure 150 may include and/or be any suitable structure that may be adapted, configured, sized, designed, and/or constructed to operatively translate second support surface 120, separation device 140, first separation assembly 221, and/or second separation assembly 222 relative to first support surface 112 and/or along support surface edge 114. As illustrative, non-exclusive examples, conveyance structure 150 may include a linear actuator, a linear motor, a servo motor, a rack-and-pinion assembly, a lead screw and nut, and/or a ball screw and nut. As another illustrative, non-exclusive example, conveyance structure 150 may include and/or be an electronically controlled conveyance structure 150 that may be controlled in any suitable manner, such as via receipt of a control signal 184 from controller 180.

Conveyance structure 150 is illustrated in dashed lines in FIGS. 3-6 to indicate that conveyance structure 150 may be operatively attached to and/or may form a portion of any suitable portion of systems 100. As an illustrative, non-exclusive example, conveyance structure 150 may be operatively attached to and/or may be configured to operatively translate separation assemblies 220, such as first separation assembly 221 and/or second separation assembly 222. As another illustrative, non-exclusive example, conveyance structure 150 may be operatively attached to and/or may be configured to operatively translate sheet-locating structure 110. As yet another illustrative, non-exclusive example, conveyance structure 150 may be operatively attached to (or may operatively link) sheet-locating structure 110 and separation assemblies 220 and may be configured to produce relative motion therebetween.

Layup surface 160 may include any suitable structure and/or surface that may be configured to receive strip 90 of composite material and may be configured to receive a plurality of strips 90 to form a radius filler, as discussed in more detail herein.

Layup surface 160 may be (at least substantially) fixed in space relative to first support surface 112 when layup surface 160 is receiving strip 90. Additionally or alternatively, layup surface 160 may not translate along support surface edge 114 when layup surface 160 is receiving strip 90. However, layup surface 160 may translate in a direction that is perpendicular to support surface edge 114 when layups surface 160 is receiving strip 90. This translation may permit strip 90 to be placed at a desired location on layup surface 160 and is discussed in more detail herein. As illustrated in FIGS. 3-4, layup surface 160 may be located vertically below first support surface 112 and/or second support surface 120 when layup surface 160 is receiving strip 90; however, this is not required.

Sheet 80 may include, or be formed from, any suitable composite material and may have any suitable shape and/or conformation. As an illustrative, non-exclusive example, sheet 80 may be a planar, or at least substantially planar, sheet 80. As another illustrative, non-exclusive example, sheet 80 may be formed from a plurality of plies 48, or layers 48, of the composite material. As illustrative, non-exclusive examples, sheet 80 may include at least 1, at least 2, at least 3, or at least 4 plies 48 of the composite material. Additionally or alternatively, sheet 80 may include fewer than 10, fewer than 8, fewer than 6, fewer than 5, fewer than 4, fewer than 3, or fewer than 2 plies 48 of the composite material.

As another illustrative, non-exclusive example, sheet 80 may include a plurality of lengths of reinforcing fiber and a resin material. The plurality of lengths of reinforcing fiber may be formed from any suitable fiber material. Illustrative, non-exclusive examples of the fiber material include carbon, titanium, aluminum, a glass, and/or a metal. Illustrative, non-exclusive examples of the resin material include an epoxy and/or a polymeric material.

As a more specific but still illustrative, non-exclusive example, sheet 80 may include four plies 48 of composite material, including a first ply, a second ply, a third ply, and a fourth ply. The first ply may include a plurality of first lengths of reinforcing fiber that may be orientated at a zero degree angle (approximately) with respect to the support surface edge. The second ply may include a plurality of second lengths of reinforcing fiber that may be orientated at a 45 degree angle (approximately) with respect to the support surface edge. The third ply may include a plurality of third lengths of reinforcing fiber that may be orientated at a 135 degree angle (approximately) with respect to the support surface edge. The fourth ply may include a plurality of fourth lengths of reinforcing fiber that may be orientated at a zero degree angle (approximately) with respect to the support surface edge. The second ply and the third ply may be located between the first ply and the fourth ply.

Controller 180 may include any suitable structure that may be adapted, configured, designed, constructed, and/or programmed to automatically control the operation of at least a portion of systems 100. As illustrative, non-exclusive examples, controller 180 may include and/or be an electronic controller, a dedicated controller, a special-purpose controller, a personal computer, a display device, a logic device, and/or a memory device. In addition, controller 180 may be programmed to perform one or more algorithms to automatically control the operation of systems 100. This may include algorithms that may be based upon, and/or that may cause controller 180 to direct systems 100 to perform, methods 400 of FIG. 14 and/or any suitable portion thereof.

As an illustrative, non-exclusive example, controller 180 may be programmed to (automatically) control the operation of sheet-locating structure 110. This may include selectively directing sheet-locating structure 110 to extend second portion 84 of sheet 80 past support surface edge 114, regulating a width of second portion 84, and/or regulating a width of strip 90 that is formed from sheet 80 by systems 100.

As another illustrative, non-exclusive example, controller 180 additionally or alternatively may be programmed to (automatically) control the operation of separation devices 140. This may include controlling the operation of separation devices 140 during separation of strip 90 from sheet 80, directing separation devices 140 to separate, second portion 84, first fraction 85, second fraction 87, and/or strip 90 from sheet 80, and/or providing power to separation devices 140 to permit separation of strip 90 from sheet 80.

As yet another illustrative, non-exclusive example, controller 180 additionally or alternatively may be programmed to (automatically) control the operation of conveyance structure 150. This may include selectively translating second support surface 120, third support surface, and/or separation devices 140 relative to first support surface 112 and/or along support surface edge 114. This also may include coordinating the operation of sheet-locating structure 110, separation devices 140, and/or conveyance structure 150 such that second portion 82, first fraction 85, second fraction 87, and/or strip 90 has a desired width and/or width profile along a length thereof.

Detection structure 182 may include any suitable structure that may be configured to detect one or more properties of second portion 82, of first fraction 85, of second fraction 87, and/or of strip 90 and/or of the radius filler that may be formed from strip 90. As illustrative, non-exclusive examples, detection structure 182 may include, or be, a laser, a light source, a photodetector, a photodetector array, a charge coupled device (CCD), and/or a camera. As another illustrative, non-exclusive example, detection structure 182 may communicate with controller 180 and/or may include an internal logic device that may be utilized to quantify the one or more properties of second portion 82, of first fraction 85, of second fraction 87, and/or of strip 90 and/or of the radius filler that may be formed from strip 90.

As a more specific but still illustrative, non-exclusive example, detection structure 182 may be configured to detect a location of strip 90 on layup surface 160. This detection may be performed in real-time and/or concurrently with strip 90 being separated from sheet 80 and/or being located and/or placed on layup surface 160. Under these conditions, detection structure 182 may be configured to generate a location indication signal, which may be indicative of the location of strip 90 on layup surface 160, and to supply the location indication signal to controller 180. As additional more specific but still illustrative, non-exclusive examples, detection structure 182 also may be configured to detect a width of strip 90 on layup surface 160 and/or to detect, or determine, a cross-sectional area of a stack of strips 90 that may be present on layup surface 160.

Systems 100 further may include a strip location-adjusting structure 162, as illustrated in FIGS. 3-6. Strip location-adjusting structure 162 may be a passive strip location-adjusting structure 162 that acts as a guide to direct and/or urge strip 90 to a desired location on layup surface 160. As an example, strip location-adjusting structure 162 may include, be, and/or be configured to interact with, an indexing structure 240, as illustrated in FIGS. 5-6. Under these conditions, and as illustrated in FIG. 5, systems 100 further may include a floating mount 230. Floating mount 230 may be configured to permit motion, limited motion, and/or constrained motion of separation assemblies 220, or first separation assembly 221, relative to conveyance structure 150 in a direction that is perpendicular, or at least substantially perpendicular, to layup surface 160. In addition, indexing structure 240 may be configured to operatively engage both separation assemblies 220, or first separation assembly 221, and layup surface 160, or a body that defines the layup surface, to maintain a fixed, or at least substantially fixed, relative orientation between the separation assembly and the layup surface in the direction that is perpendicular, or at least substantially perpendicular, to the layup surface. Such a configuration may provide accurate and/or improved placement and/or positioning of strip 90 on layup surface 160, thereby improving an accuracy and/or repeatability of a radius filler that is formed by systems 100. It is within the scope of the present disclosure that, as illustrated in FIG. 5, indexing structure 240 may include a first indexing structure 241 and a second indexing structure 242. First indexing structure 241 may be configured to operatively engage against a first edge 163 of layup surface 160, while second indexing structure 242 may be configured to operatively engage against a second edge 164 of the layup surface. Examples of indexing structures 240 include rollers, or indexing rollers, that roll against layup surface 160.

Alternatively, strip location-adjusting structure 162 may be an active strip location-adjusting structure 162 that may be in communication with controller 180 and/or that may be configured to actively and/or dynamically adjust the location of the strip of composite material on the layup surface. This adjustment may be based, at least in part, on the location indication signal. As an illustrative, non-exclusive example, the location indication signal may indicate that strip 90 is not at the desired location (or within a desired location range) on layup surface 160 and strip location-adjusting structure 162 may adjust the location of strip 90 based upon this indication.

Strip location-adjusting structure 162 may adjust the location of strip 90 on layup surface 160 in any suitable manner. As an illustrative, non-exclusive example, strip location-adjusting structure 162 may be configured to operatively translate layup surface 160 relative to first support surface 112 to adjust the location of strip 90 on layup surface 160. This may include operatively translating layup surface 160 in a direction that is perpendicular to support surface edge 114, as discussed herein. As another illustrative, non-exclusive example, strip location-adjusting structure 162 may be configured to operatively translate strip 90 relative to layup surface 160 prior to strip 90 being received by layup surface 160. This may include operatively translating strip 90 in a direction that is perpendicular to support surface edge 114.

Systems 100 also may include a strip width-adjusting structure 122 that may be configured to adjust a width of strip 90 during formation thereof. This may include adjusting and/or varying the width of strip 90 along the length of strip 90 and/or adjusting and/or varying the width of strip 90 without changing a distance that second portion 84 of sheet 80 extends past support surface edge 114. Additionally or alternatively, this also may include adjusting and/or varying the width of strip 90 during, or concurrently with, separation of strip 90 from sheet 80.

Strip width-adjusting structure 122 may adjust the width of strip 90 in any suitable manner. As an illustrative, non-exclusive example, strip width-adjusting structure 122 may be configured to translate separation device 140 and/or second support surface 120 relative to first support surface 112. As another illustrative, non-exclusive example, strip width-adjusting structure 122 may be configured to translate separation device 140 and/or second support surface 120 in the direction that is perpendicular to support surface edge 114. As yet another illustrative, non-exclusive example, strip width-adjusting structure 122 may be configured to adjust width 132 of gap 130.

Strip width-adjusting structure 122 may include and/or be an electronically controlled strip width-adjusting structure that may be controlled in any suitable manner. As an illustrative, non-exclusive example, controller 180 may send control signal 184 to strip width-adjusting structure 122 to control the operation thereof.

Compaction structure 156 may include and/or be any suitable structure that may be utilized to compact strip 90 on layup surface 160, onto layup surface 160, and/or onto another strip 90 that may be present on layup surface 160. As an illustrative, non-exclusive example, compaction structure 156 may include a compaction roller. Compaction structure 156 may be operatively coupled to and/or configured to translate with second support surface 120, separation device 140, and/or transition surface 170, such as via operation of conveyance structure 150. Compaction structure 156 may be configured to compact strip 90 concurrently with separation of strip 90 from sheet 80 and/or concurrently with operation of conveyance structure 150. Compaction structure 156 may be an electronically actuated compaction structure 156, and controller 180 may control the operation of compaction structure 156. As an illustrative, non-exclusive example, a pressure that may be applied to strip 90 by compaction structure 156 and/or a time that compaction structure 156 compacts strip 90 may be selected, regulated, and/or controlled by controller 180.

Additionally or alternatively, compaction structure 156 may include a height adjustment mechanism 158, which may be configured to adjust, or to actively adjust, a height of layup surface 160 relative to second support surface 120. This may include adjustment, or active adjustment, of the height of the layup surface relative to the second support surface based, at least in part, on a height of a partially completed radius filler that is positioned on the layup surface. As an example, height adjustment mechanism 158 may be configured to maintain a constant, or at least substantially constant, distance between a top surface of the partially completed layup mandrel and the second support surface. As another example, height adjustment mechanism may include a height detector 159, which may be configured to detect the height of the partially completed radius filler and/or to detect the distance between the top surface of the partially completed radius filler and the second support surface. Under these conditions, height adjustment mechanism 158 may adjust the height of the layup surface based, at least in part, on the detected height and/or distance.

With continued reference to FIGS. 5-6, systems 100 also may include at least one feed roller 250. Feed roller 250, when present, may be configured to convey strip 90 from separation device 140 and/or toward layup surface 160. The at least one feed roller 250 may include a single feed roller, which presses against a single side of strip 90, or a pair of opposed feed rollers 250, which may be configured to roll against opposed sides of strip 90.

Feed rollers 250, when present, may include and/or be motorized feed rollers 250. As an example, feed rollers 250 may be servo-controlled feed rollers 250. Under these conditions, systems 100 further may include a feedback mechanism 252. Feedback mechanism 252 may be configured to vary a rotational velocity of feed rollers 250 based, at least in part, on a linear velocity at which conveyance structure 150 operatively translates second support surface 120 and separation device 140, or first separation device 141, along support surface edge 114. Feedback mechanism 252 thus may be utilized to decrease a potential for damage to and/or tearing of strip 90 during formation thereof and/or while strip 90 is conveyed to layup surface 160.

FIGS. 8-11 provide additional, less schematic, examples of portions of systems 100 according to the present disclosure. Stated another way, FIGS. 8-11 may be more detailed and/or less schematic illustrations of systems 100, including systems 100 that are discussed herein with reference to FIGS. 3-6. With this in mind, any of the structures, functions, and/or features of systems 100 discussed herein with reference to one or more of FIGS. 8-11 may be included in and/or utilized with systems 100 of FIGS. 3-6 without departing from the scope of the present disclosure. Similarly, any of the structures, functions, and/or features of systems 100 discussed herein with reference to one or more of FIGS. 3-6 may be included in and/or utilized with systems 100 of FIGS. 8-11 without departing from the scope of the present disclosure.

Figure 8:
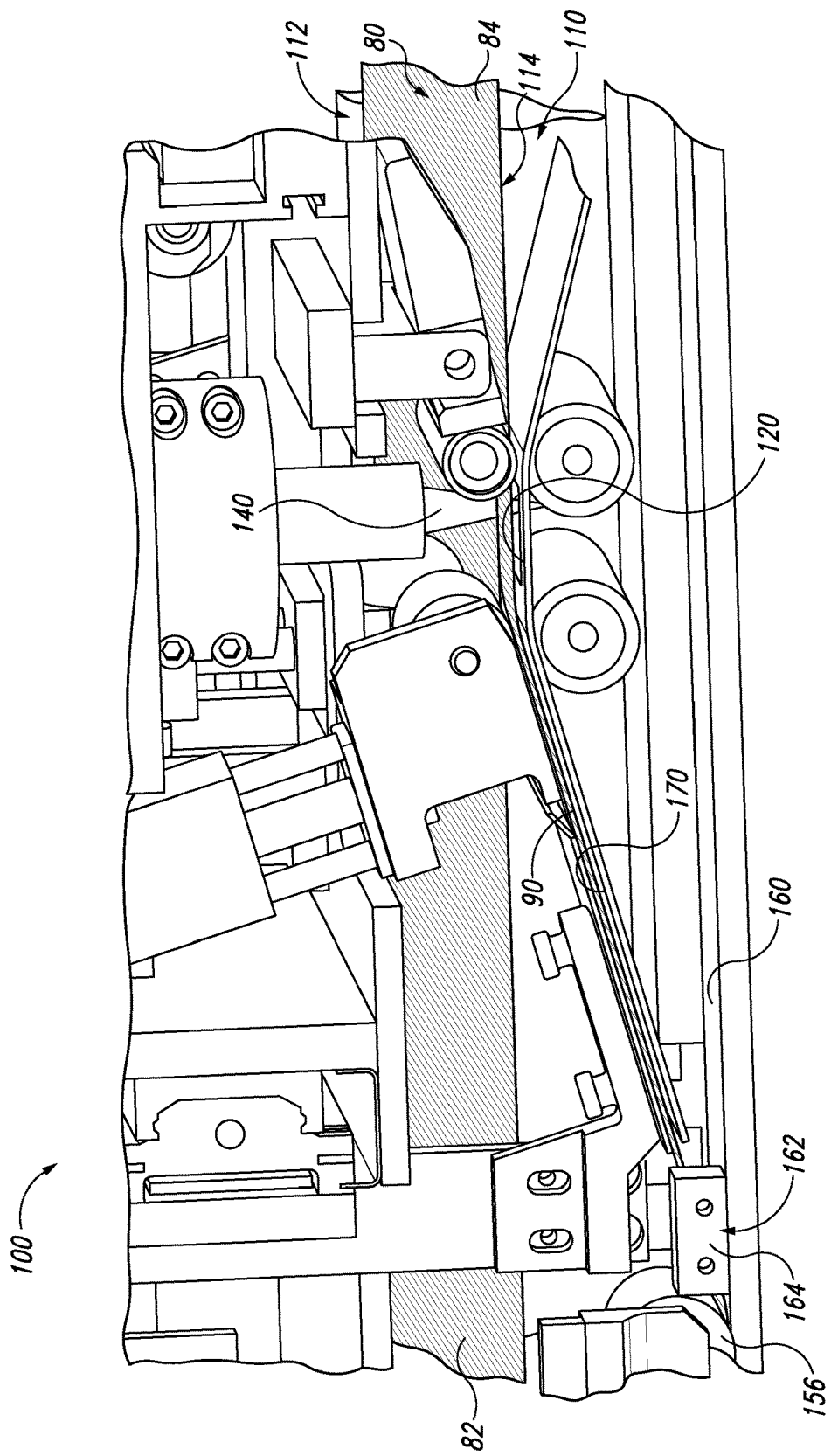
FIG. 8 is a less schematic but still illustrative, non-exclusive example of a portion of a system, according to the present disclosure, for forming a radius filler for a composite structure.

FIG. 8 is a less schematic but still illustrative, non-exclusive example of a portion of a system 100, according to the present disclosure, for forming a radius filler for a composite structure. System 100 of FIG. 8 includes a sheet-locating structure 110 that defines a first support surface 112 and a support surface edge 114. First support surface supports a first portion 82 of a sheet 80 of composite material and a second portion 84 of sheet 80 extends past support surface edge 114.

System 100 further includes a second support surface 120, which supports second portion 84, and a separation device 140. Separation device 140 is configured to separate second portion 84 from first portion 82 to form a strip 90 of composite material. This separation may be accomplished through motion of second support surface 120 and separation device 140 relative to first support surface 112 and sheet 80. Subsequent to being separated from sheet 80, strip 90 is conveyed along a transition surface 170 to a layup surface 160. A compaction structure 156, in the form of a compaction roller, compacts strip 90 on layup surface 160. The operation of the various structures of system 100 of FIG. 8 is discussed herein with reference to FIGS. 3-6.

System 100 also includes a strip location-adjusting structure 162. Strip location-adjusting structure 162 may be configured to (actively or passively) adjust a location of strip 90 on layup surface 160 and/or direct strip 90 to a desired and/or target location on layup surface 160. In the illustrative, non-exclusive example of FIG. 8, strip location-adjusting structure 162 includes a pair of guide plates 164 that are positioned on opposed edges of strip 90. During operation of system 100, a distance between guide plates 164 may be (automatically) adjusted based upon the width of strip 90. In addition, a location of guide plates 164 may be (automatically) adjusted to adjust the location of strip 90 on layup surface 160.

Figure 9:
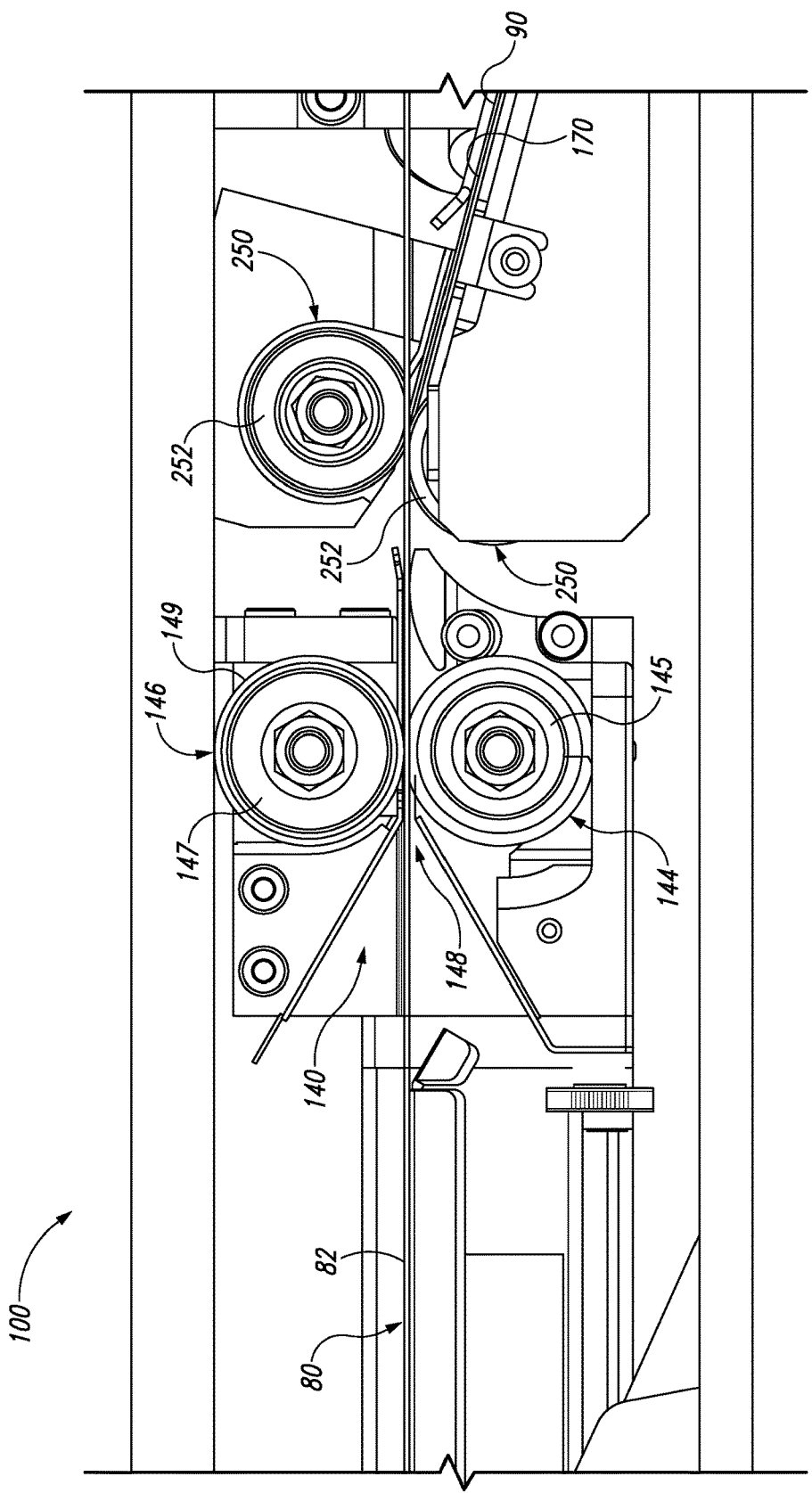
FIG. 9 is a less schematic but still illustrative, non-exclusive example of a separation device that may be included in and/or utilized with a system, according to the present disclosure.

FIG. 9 is a less schematic but still illustrative, non-exclusive example of a separation device 140 that may be included in and/or utilized with a system 100, according to the present disclosure. Separation device 140 includes a circular blade 144 and an opposed cylindrical anvil 146 that defines a cylindrical anvil surface 149. As illustrated in FIG. 9, circular blade 144 and cylindrical anvil 146 define a contact region 148 therebetween, and system 100 is configured to extend sheet of composite material 80 into contact region 148. In contact region 148, circular blade 144 and cylindrical anvil 146 press against opposed sides of sheet of composite material 80, thereby separating first portion 82 from strip 90.

It is within the scope of the present disclosure that cylindrical anvil surface 149 may include and/or be a sacrificial cylindrical anvil surface 149. Under these conditions, circular blade 144 may extend past cylindrical anvil surface 149 and at least partially into opposed cylindrical anvil 146. Such a configuration may facilitate clean and/or complete separation of strip 90 from first portion 82.

With this in mind, circular blade 144 may be formed from a blade material, such as a metal, a hardened metal, a steel, a stainless steel, and/or a carbide. In contrast, cylindrical anvil 146 may be formed from an anvil material, such as a soft metal, a polymer, and/or a plastic, that is softer than the blade material. As an example the blade material may define a blade elastic modulus, the anvil material may define an anvil material elastic modulus, and the blade material elastic modulus may be greater than the anvil material elastic modulus. As examples, the blade material elastic modulus may be at least 50, at least 100, at least 200, at least 300, at least 400, at least 500, at least 600, at least 700, at least 800, at least 900, or at least 1000 times greater than the anvil material elastic modulus.

In the example of FIG. 9, system 100 further includes a blade drive assembly 145 and an anvil drive assembly 147. Blade drive assembly is configured to operatively rotate circular blade 144 relative to sheet 80. Similarly, anvil drive assembly 147 is configured to operatively rotate cylindrical anvil 146 relative to sheet 80. Such a configuration may decrease a potential for binding of sheet 80 within contact region 148 and/or may provide for improved separation of strip 90 from sheet 80.

FIG. 9 also illustrates feed rollers 250, which may be configured to convey strip 90 from separation device 140, across a transition surface 170, and/or toward a layup surface, such as layup surface 160 of FIGS. 3-6. As discussed herein, system 100 may include two opposed feed rollers 250, which may press against opposed sides of strip 90. Feed rollers 250 may be powered, or servo-controlled, feed rollers 250, and system 100 may include a feedback mechanism that regulates rotation of feed rollers 250, such as to decrease a potential for damage to and/or tearing of strip 90.

Figure 10:
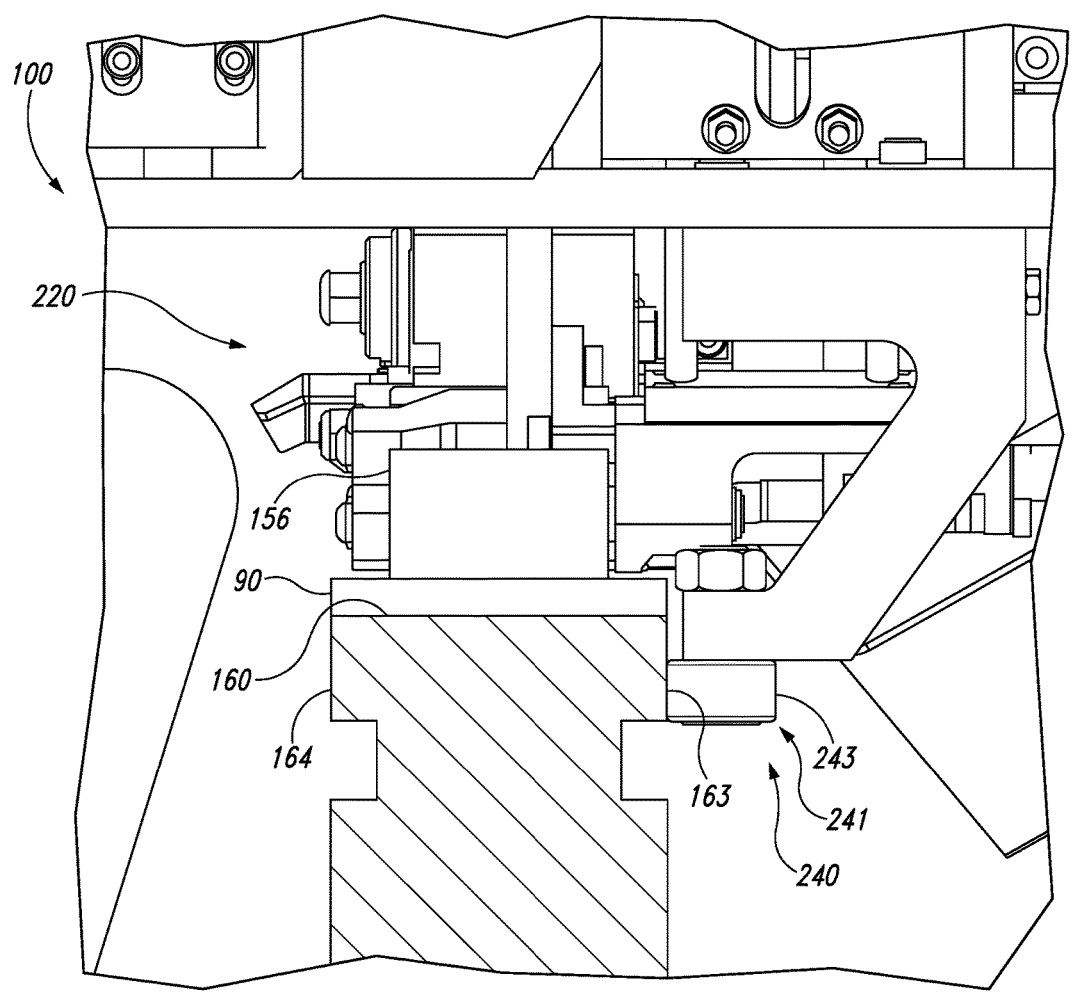
FIG. 10 is a less schematic but still illustrative, non-exclusive example of a feed roller that may be included in and/or utilized with a system, according to the present disclosure.

FIG. 10 is a less schematic but still illustrative, non-exclusive example of an indexing structure 240 that may be included in and/or utilized with a system 100, according to the present disclosure. As illustrated in FIG. 10, system 100 includes a separation assembly 220 configured to separate a strip 90 of composite material from a sheet of composite material and to direct strip 90 onto a layup surface 160. Layup surface 160 includes a first edge 163 and a second edge 164, and indexing structure 240 operatively engages first edge 163. More specifically, a first indexing structure 241, in the form of an indexing roller 243, operatively engages and/or presses against first edge 163, thereby precisely locating separation assembly 220 relative to layup surface 160.

As discussed in more detail herein with reference to FIGS. 5-6, system 100 also may include a second indexing structure 242. Second indexing structure 242, when present, may operatively engage second edge 164 of layup surface 160.

FIG. 10 also illustrates system 100 as including a compaction structure 156. Compaction structure 156, which may include and/or be a compaction roller, operatively engages strip 90 to press and/or compact strip 90 against layup surface 160.

Figure 11:
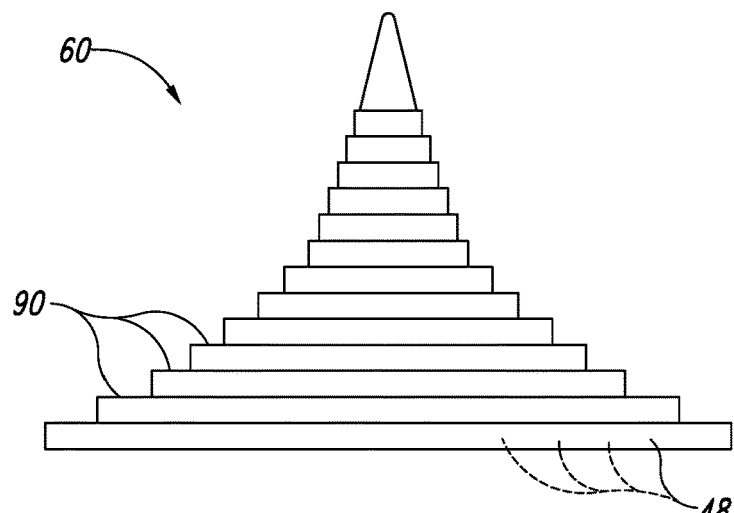
FIG. 11 is a schematic end view of a radius filler that may be formed utilizing the systems and methods according to the present disclosure.
Figure 12:
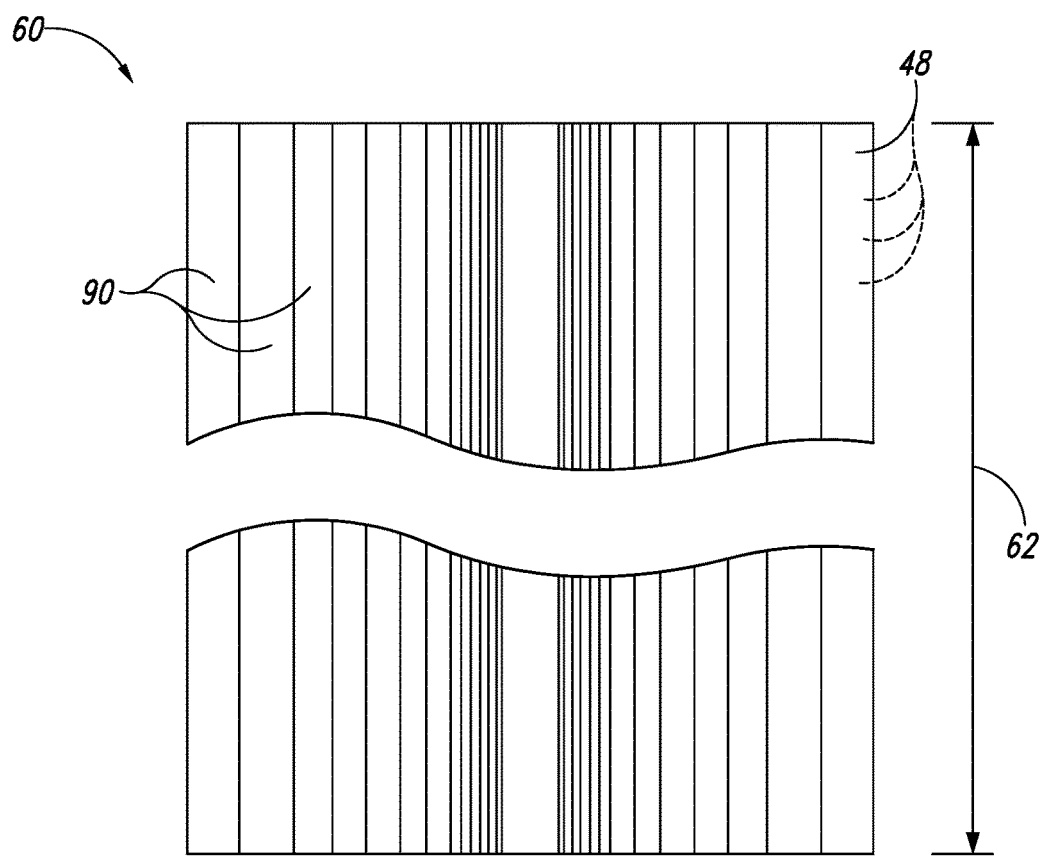
FIG. 12 is a schematic top view of the radius filler of FIG. 11.

FIG. 11 is a schematic end view of a radius 60 filler that may be formed utilizing the systems and methods according to the present disclosure, while FIG. 12 is a schematic top view of radius filler 60 of FIG. 11. In FIGS. 11-12, radius filler 60 includes a plurality of strips 90 of composite material. As illustrated, strips 90 may vary in width, thereby causing radius filler 60 to have a stepped, tapered, pointed, and/or quasi-triangular cross-sectional shape. As discussed herein, each strip 90 may include one or more plies 48 of composite material.

In FIGS. 11-12 radius filler 60 is illustrated as being symmetrical and as having a (substantially) constant cross-sectional shape along a longitudinal length 62 thereof. However, and as discussed herein, the systems and methods according to the present disclosure may be utilized to form other radius fillers 60. This may include radius fillers 60 that do not have a symmetrical cross-sectional shape, radius fillers 60 that have a cross-sectional shape that is different from the illustrated cross-sectional shape, and/or radius fillers 60 with a cross-sectional shape that varies along the longitudinal length of radius filler 60 in a predetermined and/or preselected manner.

It is within the scope of the present disclosure that the systems and methods disclosed herein may be utilized to form radius fillers 60 of any suitable longitudinal length 62. As illustrative, non-exclusive examples, longitudinal length 62 may be at least 5 meters, at least 6 meters, at least 7 meters, at least 8 meters, at least 9 meters, at least 10 meters, at least 15 meters, at least 20 meters, at least 25 meters, at least 30 meters, at least 35 meters, and/or at least 40 meters. Additionally or alternatively, longitudinal length 62 also may be less than 60 meters, less than 55 meters, less than 50 meters, less than 45 meters, less than 40 meters, less than 35 meters, less than 30 meters, less than 25 meters, less than 20 meters, less than 18 meters, less than 16 meters, less than 14 meters, less than 12 meters, and/or less than 10 meters.

FIG. 13 is a flowchart depicting methods 400, according to the present disclosure, of forming a radius filler for a composite structure. Methods 400 include locating a sheet of composite material at 405 and translating the sheet of composite material at 410. Methods 400 may include supporting the sheet of composite material at 415 and include separating a second portion of the sheet of composite material from a first portion of the sheet of composite material at 420. Methods 400 further may include detecting a width of a strip of composite material at 425, detecting a cross-sectional area of a stack of strips of composite material at 430, and/or regulating the width of the strip of composite material at 435. Methods 400 also include conveying the strip of composite material onto a layup surface at 440 and may include detecting a location of the strip of composite material at 445, regulating the location of the strip of composite material at 450, and/or compacting the strip of composite material on the layup surface at 455. Methods 400 further may include maintaining, at 460, tension on the strip of composite material and include repeating at least a portion of the methods at 465.

Locating, at 405, the sheet of composite material may include locating any suitable sheet of composite material on a support surface, which also may be referred to herein as a first support surface. The locating at 405 may be accomplished in any suitable manner. As an illustrative, non-exclusive example, the locating at 405 may include forming the sheet of composite material on the first support surface.

As another illustrative, non-exclusive example, the locating at 405 also may include locating a previously formed (or pre-formed) sheet of composite material on the first support surface.

The first support surface may be defined by a sheet-locating structure and may terminate at a support surface edge. Illustrative, non-exclusive examples of the sheet of composite material, the first support surface, the support surface edge, and the sheet-locating structure are disclosed herein.

Translating, at 410, the sheet of composite material may include translating the sheet of composite material such that a first portion of the sheet of composite material is supported by the first support surface and also such that the second portion of the sheet of composite material extends past (or is cantilevered over) the support surface edge. The translating at 410 may include translating such that the second portion of the sheet of composite material has a selected, predetermined, preselected, and/or predefined second portion width. Additionally or alternatively, the translating at 410 also may include translating such that the strip of composite material that is formed during the separating at 420 has a selected, predetermined, preselected, and/or predefined strip width.

As discussed in more detail herein, the first support surface may be defined by a charge-advance belt. Under these conditions, the translating at 410 may include moving the charge-advance belt.

Supporting, at 415, the sheet of composite material may include supporting the second portion of the sheet of composite material and/or supporting with a second support surface. The second support surface may be adjacent to the first support surface, may be (at least substantially) parallel to the first support surface, and/or may be (at least substantially) coplanar with the first support surface. Illustrative, non-exclusive examples of the second support surface are disclosed herein.

It is within the scope of the present disclosure that the supporting at 415 may include supporting a first fraction of the second portion of the sheet of composite material with the second support surface and also supporting a second fraction of the second portion of the sheet of composite material with a third support surface that is spaced-apart and/or distinct from the second support surface. The third support surface may support the second fraction at least partially concurrently with support of the first fraction by the second support surface.

Separating, at 420, the second portion of the sheet of composite material from the first portion of the sheet of composite material may include separating to form the strip of composite material. This may include separating with a separation device, illustrative, non-exclusive examples of which are disclosed herein.

When the supporting at 415 includes supporting the first fraction with the second support surface and also supporting the second fraction with the third support surface, the separation device may be a first separation device, which is associated with the second support surface. Under these conditions, the separating at 420 also may include separating the second fraction of the second portion of the sheet of composite material from the first portion of the sheet of composite material and/or from the first fraction of the second portion of the sheet of composite material. The separating the second fraction may be concurrent, or at least partially concurrent, with the separating the first fraction, and the separating at 420 further may include directing the second fraction of the second portion of the sheet of composite material toward, to, and/or into a scrap bin. The scrap bin may be distinct and/or spaced-apart from the layup surface.

The separating at 420 may be accomplished in any suitable manner. As an illustrative, non-exclusive example, the separating at 420 may include conveying the second support surface and/or the separation device along the support surface edge, such as to cut and/or slit the sheet of composite material along the support surface edge and form the strip of composite material. As another illustrative, non-exclusive example, the separating at 420 also may include extending the separation device (completely) through the sheet of composite material. Examples of the separation device are disclosed herein with reference to separation devices 140 of FIGS. 3-6 and 8-9.

As yet another example, and as discussed herein, the separation device may include a circular blade and an opposed cylindrical anvil. The cylindrical anvil may define a cylindrical anvil surface. Under these conditions, the separating at 420 may include compressing the sheet of composite material between the circular blade and the cylindrical anvil surface. Stated another way, the circular blade and the cylindrical anvil surface may define a contact region therebetween, and the separating at 420 may include extending the sheet of composite material within, into, and/or through the contact region.

It is within the scope of the present disclosure that the circular blade and/or the cylindrical anvil, when present, may be powered and/or driven structures. As such, the separating at 240 may include operatively rotating the circular blade, such as relative to the sheet of composite material, with a blade drive assembly. Additionally or alternatively, the separating at 240 may include operatively rotating the cylindrical anvil, such as relative to the sheet of composite material, with an anvil drive assembly.

Detecting, at 425, the width of the strip of composite material may include detecting in any suitable manner. As an illustrative, non-exclusive example, the detecting at 425 may include detecting with a detection structure, illustrative, non-exclusive examples of which are disclosed herein. The detecting at 425 may include detecting during the separating at 420 and/or (at least partially) concurrently with the separating at 420.

Detecting, at 430, the cross-sectional area of the stack of strips of composite material may include detecting in any suitable manner. As an illustrative, non-exclusive example, the detecting at 430 may include detecting with the detection structure. As another illustrative, non-exclusive example, the detecting at 430 also may include calculating the cross-sectional area of the stack of strips based, at least in part, on the width of each of the strips of composite material that comprise the stack of strips of composite material, with the width of each of the strips being determined during the detecting at 425.

Regulating, at 435, the width of the strip of composite material may include regulating in any suitable manner. As an illustrative, non-exclusive example, the regulating at 435 may include moving the separation device toward the first support surface to increase the width of the strip of composite material. As another illustrative, non-exclusive example, the regulating at 435 also may include moving the separation device away from the first support surface to decrease the width of the strip of composite material. The regulating at 435 may be performed (at least partially) concurrently with the separating at 420, with the detecting at 425, and/or with the detecting at 430.

In addition, the regulating at 435 also may be based upon any suitable criteria. As an illustrative, non-exclusive example, the regulating at 435 may include regulating such that the strip of composite material has a predetermined, preselected, and/or predefined width along a length of the strip of composite material. As another illustrative, non-exclusive example, the regulating at 435 also may include regulating such that the strip of composite material has a predetermined, preselected, and/or predefined width profile along the length of the strip of composite material.

As yet another illustrative, non-exclusive example, the regulating at 435 may include regulating such that the stack of strips of composite material has a predetermined, preselected, and/or predefined cross-sectional area along a length of the stack of strips of composite material. As another illustrative, non-exclusive example, the regulating at 435 may include regulating such that the stack of strips of composite material has a predetermined, preselected, and/or predefined cross-sectional area variation and/or profile along the length of the stack of strips of composite material.

As yet another illustrative, non-exclusive example, the regulating at 435 may be based, at least in part, on a detected width of the strip of composite material, such as may be determined during the detecting at 425. As another illustrative, non-exclusive example, the regulating at 435 may be based, at least in part, on a detected cross-sectional area of the stack of strips of composite material, such as may be determined during the detecting at 430.

Conveying, at 440, the strip of composite material onto the layup surface may include locating and/or placing the strip of composite material on the layup surface and may be performed concurrently with the separating at 420, concurrently with the detecting at 425, concurrently with the detecting at 430, and/or concurrently with the regulating at 435. The conveying at 440 may include translating the strip of composite material across the second support surface and/or onto the layup surface. Additionally or alternatively, the conveying at 440 also may include translating the strip of composite material across a transition surface that extends between the second support surface and the layup surface. Illustrative, non-exclusive examples of the transition surface are disclosed herein.

Detecting, at 445, the location of the strip of composite material may include detecting the location of the strip of composite material on the layup surface and may be accomplished in any suitable manner. As an illustrative, non-exclusive example, the detecting at 445 may include detecting with the detection structure, which is discussed herein.

Regulating, at 450, the location of the strip of composite material may include regulating the location of the strip of composite material on the layup surface and may be accomplished in any suitable manner. As an illustrative, non-exclusive example, the regulating at 450 may include moving the layup surface relative to the support surface such that the strip of composite material is placed at a predetermined, preselected, and/or predefined location on the layup surface as a result of the conveying at 440. As another illustrative, non-exclusive example, the regulating at 450 additionally or alternatively may include moving the layup surface relative to the support surface edge. The layup surface may be moved via a strip location-adjusting structure, illustrative, non-exclusive examples of which are disclosed herein.

The regulating at 450 additionally or alternatively may include maintaining a fixed, or at least substantially fixed, relative orientation between a separation assembly, which includes the second support surface and the separation device, and a centerline of the layup surface. This may include maintaining the fixed relative orientation during, or concurrently with, the separating at 420. The maintaining may include operatively translating the separation assembly in a direction that is perpendicular, or at least substantially perpendicular, to a longitudinal length of the layup surface. Additionally or alternatively, the maintaining may include utilizing a floating mount, such as floating mount 230 of FIGS. 5-6, and/or an indexing structure, such as indexing structure 240 of FIGS. 5-6 and 10, to maintain the relative orientation.

Compacting, at 455, the strip of composite material on the layup surface may include compacting in any suitable manner. As an illustrative, non-exclusive example, the compacting at 455 may include compacting with a compaction structure, illustrative, non-exclusive examples of which are disclosed herein.

The compacting at 455 may include actively controlling a compaction force applied to the strip of composite material. As an example, the actively controlling may include adjusting a height of the layup surface relative to the second support surface, such as with a height adjustment mechanism. This may include adjusting to maintain a constant, or at least substantially constant, distance between a top surface of a partially completed radius filler, which is positioned on the layup surface, and the second support surface. The compacting at 455 may be performed (at least substantially) concurrently with the separating at 420, with the detecting at 425, with the detecting at 430, with the regulating at 435, with the conveying at 440, with the detecting at 445, and/or with the regulating at 450.

Maintaining, at 460, tension on the strip of composite material may include maintaining tension to permit and/or facilitate the conveying at 420. The maintaining at 460 may be performed concurrently, or at least substantially concurrently, with the translating at 410, with the separating at 420, and/or with the conveying at 440. The maintaining at 460 may be accomplished in any suitable manner. As an example, the maintaining at 460 may include maintaining with, via, and/or utilizing at least one motorized feed roller, examples of which are disclosed herein. As another example, the maintaining at 460 may include varying, or selectively varying, a rotational frequency of the at least one feed roller based, at least in part, on a rate at which the second portion of the sheet of composite material is separated from the first portion of the sheet of composite material during the separating at 420.

Repeating, at 465, at least the portion of the methods may include repeating any suitable portion of methods 400. As an illustrative, non-exclusive example, the repeating at 465 may include repeating at least the translating at 410, the supporting at 415, the separating at 420, and the conveying at 440 to sequentially locate the plurality of strips of composite material on the layup surface and/or to form the stack of strips of composite material. The stack of strips of composite material may form, or form a portion of, the radius filler.

As another illustrative, non-exclusive example, the repeating at 465 may include repeatedly conveying the second support surface and the separation device along the support surface edge to form the plurality of strips of composite material. Under these conditions, the translating at 410, the separating at 420, and the conveying at 440 may be interleaved and/or sequentially performed during each instance of the repeatedly conveying.

As yet another illustrative, non-exclusive example, the repeating at 465 may include forming a plurality of scraps of composite material that is not conveyed onto the layup surface. For example, and when the strips of composite material do not have a uniform width across their length, a scrap of composite material may be formed intermediate to forming two strips of composite material, with the scrap of composite material being formed to define a desired, target, or predetermined edge profile for each strip of composite material.

Figure 14:
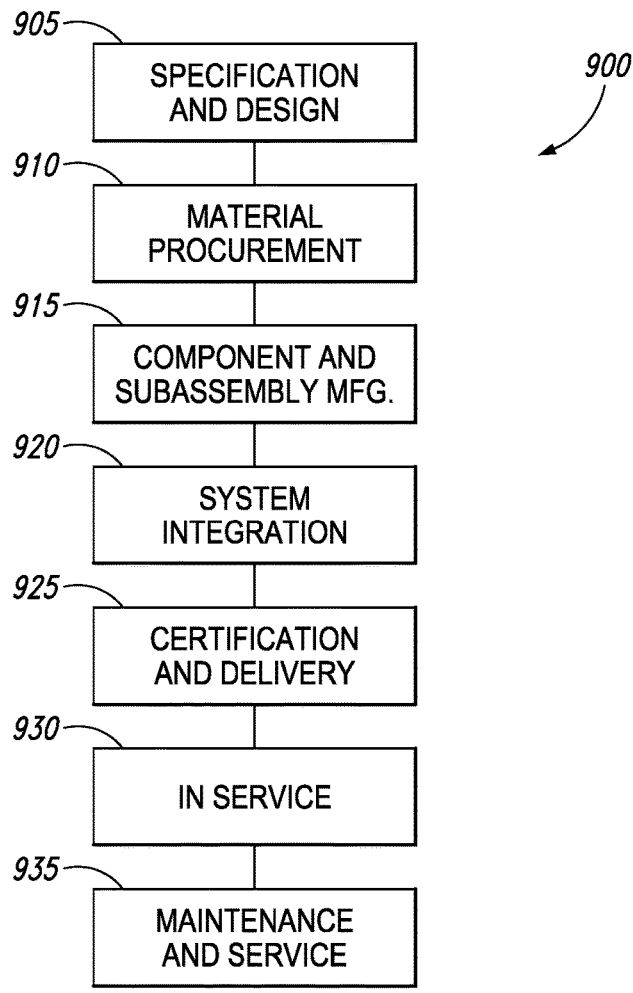
FIG. 14 is a flow diagram of aircraft production and service methodology.
Figure 15:
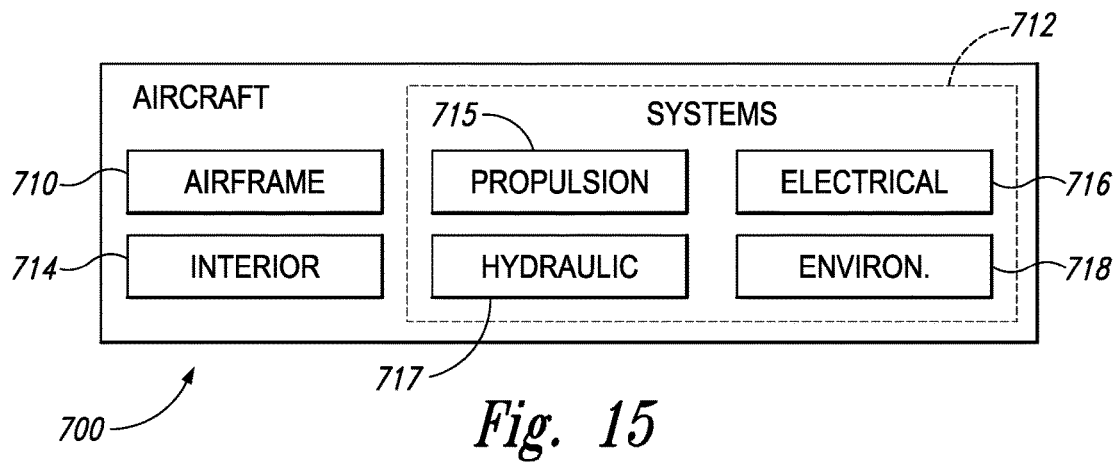
FIG. 15 is a block diagram of an aircraft.

Referring now to FIGS. 14-15, embodiments of the disclosure may be described in the context of an aircraft manufacturing and service method 900, as shown in FIG. 14, and an aircraft 700, as shown in FIG. 15. During pre-production, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Systems and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, maintenance and service 935.

Illustrative, non-exclusive examples of inventive subject matter according to the present disclosure are described in the following enumerated paragraphs:

A1. A system for forming a radius filler for a composite structure, the system comprising:

a sheet-locating structure having a support surface, or a first support surface, configured to support a first portion of a sheet of composite material, wherein the support surface, or the first support surface, has a support surface edge, and further wherein the sheet-locating structure is configured to selectively extend a second portion of the sheet of composite material past the support surface edge;

optionally a second support surface that is adjacent the support surface edge of the support surface, or the first support surface, wherein the support surface, or the first support surface, and the second support surface define a gap therebetween, and further wherein the second support surface is configured to support the second portion of the sheet of composite material;

a separation device configured to separate the second portion of the sheet of composite material from the first portion of the sheet of composite material to form a strip of composite material;

a conveyance structure configured to operatively translate the separation device, and optionally the second support surface, along the support surface edge of the support surface, or the first support surface, to form the strip of composite material; and a layup surface configured to receive the strip of composite material, optionally from the second support surface, subsequent to the strip of composite material being separated from the sheet of composite material.

A2. The system of paragraph A1, wherein the sheet-locating structure comprises:

a support table having a table surface and a table edge;

a charge-advance belt, wherein the charge-advance belt extends across the table surface and the table edge and defines the support surface, or the first support surface, and the support surface edge; and a charge-advance drive configured to selectively translate the charge-advance belt relative to the support table to selectively extend the second portion of the sheet of composite material past the support surface edge.

A3. The system of paragraph A2, wherein the charge-advance belt is formed from a material that will not contaminate the sheet of composite material.

A4. The system of any of paragraphs A2-A3, wherein the charge-advance drive is an electronically controlled charge-advance drive.

A5. The system of any of paragraphs A1-A4, wherein the first portion of the sheet of composite material is in direct physical contact with the support surface, or the first support surface.

A6. The system of any of paragraphs A1-A5, wherein a backing paper does not extend between the sheet of composite material and the support surface, or the first support surface.

A7. The system of any of paragraphs A1-A6, wherein the sheet-locating structure is an electronically controlled sheet-locating structure.

A8. The system of any of paragraphs A1-A7, wherein the gap has a width of at least one of:

(i) less than 10 millimeters (mm), less than 8 mm, less than 6 mm, less than 4 mm, less than 2 mm, or less than 1 mm; and (ii) at least 0.5 mm, at least 1 mm, at least 2 mm, at least 3 mm, or at least 4 mm.

A9. The system of any of paragraphs A1-A8, wherein the support surface, or the first support surface, and/or a/the second support surface are at least one of:

(i) (at least substantially) coplanar; and (ii) (at least substantially) parallel.

A10. The system of any of paragraphs A1-A9, wherein a/the second support surface is configured to support a fraction of the second portion of the sheet of composite material.

A11. The system of paragraph A10, wherein the fraction includes at least one of:

(i) less than 50%, less than 40%, less than 30%, less than 20%, less than 15%, less than 10%, less than 5%, less than 4%, less than 3%, less than 2%, or less than 1% of a surface area of the second portion of the sheet of composite material; and (ii) at least 0.1%, at least 0.5%, at least 1%, at least 2%, at least 3%, at least 4%, at least 5%, at least 6%, at least 7%, at least 8%, at least 9%, or at least 10% of the surface area of the second portion of the sheet of composite material.

A12. The system of any of paragraphs A1-A11, wherein the system further includes a transition surface that extends from a/the second support surface to the layup surface.

A13. The system of paragraph A12, wherein the transition surface extends at a skew angle relative to a/the second support surface.

A14. The system of any of paragraphs A12-A13, wherein the transition surface extends at a skew angle relative to the layup surface.

A15. The system of any of paragraphs A12-A14, wherein the transition surface is operatively coupled to, and configured to translate with, a/the second support surface and the separation device via the conveyance structure.

A16. The system of any of paragraphs A1-A15, wherein the separation device is configured to extend entirely through the sheet of composite material when separating the strip of composite material from the sheet of composite material.

A17. The system of any of paragraphs A1-A16, wherein a recess extends from a/the second support surface, and further wherein the separation device extends (at least partially) within the recess.

A18. The system of any of paragraphs A1-A17, wherein the separation device at least one of:

(i) extends from above the support surface, or the first support surface, and a/the second support surface and into a/the recess;

(ii) extends from a/the recess and above the support surface, or the first support surface, and a/the second support surface; and (iii) extends both above and below a/the second support surface.

A19. The system of any of paragraphs A1-A18, wherein the separation device includes a cutting device configured to cut the strip of composite material from the sheet of composite material.

A20. The system of any of paragraphs A1-A19, wherein the separation device includes at least one of a knife, an ultrasonic knife, a blade, and a shear.

A21. The system of any of paragraphs A1-A20, wherein the separation device is an electronically controlled separation device.

A21.1 The system of any of paragraphs A1-A21, wherein the separation device includes a circular blade and an opposed cylindrical anvil that defines a cylindrical anvil surface.

A21.1.1 The system of paragraph A21.1, wherein the circular blade and the cylindrical anvil surface define a contact region therebetween, and further wherein the system is configured to extend the sheet of composite material into the contact region to separate the second portion of the sheet of composite material from the first portion of the sheet of composite material and form the strip of composite material.

A21.1.1.1 The system of paragraph A21.1.1, wherein the cylindrical anvil surface is a sacrificial cylindrical anvil surface, and further wherein the circular blade extends past the cylindrical anvil surface and at least partially into the opposed cylindrical anvil.

A21.1.2 The system of any of paragraphs A21.1-A21.1.1.1, wherein the circular blade is formed from a blade material, and further wherein the blade material includes, optionally is, and further optionally consists essentially of, at least one of a metal, a hardened metal, steel, and a carbide.

A21.1.3 The system of any of paragraphs A21.1-A21.1.2, wherein the cylindrical anvil surface of the opposed circular anvil is defined by an anvil material, and further wherein the anvil material includes, optionally is, and further optionally consists essentially of at least one of a soft metal, a polymer, and a plastic.

A21.1.4. The system of any of paragraphs a21.1-A21.1.1.3, wherein the circular blade is formed from a/the blade material that defines a blade material elastic modulus, wherein the cylindrical anvil surface of the opposed circular anvil is formed from a/the anvil material that defines an anvil material elastic modulus, and further wherein the blade material elastic modulus is greater than the anvil material elastic modulus.

A21.1.4.1 The system of paragraph A21.1.4, wherein the blade material elastic modulus is at least 50, at least 100, at least 200, at least 300, at least 400, at least 500, at least 600, at least 700, at least 800, at least 900, or at least 1000 times greater than the anvil material elastic modulus.

A21.1.5 The system of any of paragraphs A21.1-A21.1.4.1, wherein the separation device further includes at least one, and optionally both, of:

(i) a blade drive assembly configured to operatively rotate the circular blade relative to the sheet of composite material; and (ii) an anvil drive assembly configured to operatively rotate the cylindrical anvil relative to the sheet of composite material.

A22. The system of any of paragraphs A1-A21, wherein the conveyance structure includes at least one of a linear actuator, a linear motor, a servo motor, a rack-and-pinion assembly, a lead screw and nut, and a ball screw and nut.

A23. The system of any of paragraphs A1-A22, wherein the conveyance structure is an electronically controlled conveyance structure.

A24. The system of any of paragraphs A1-A23, wherein a/the second support surface and the separation device are operatively coupled to one another.

A25. The system of any of paragraphs A1-A24, wherein a/the second support surface and the separation device are configured to translate together via the conveyance structure.

A26. The system of any of paragraphs A1-A25, wherein the layup surface is configured to receive a plurality of stacked strips of composite material during operation of the system.

A27. The system of any of paragraphs A1-A26, wherein the layup surface is (at least substantially) fixed in space relative to the support surface, or the first support surface, during receipt of the strip of composite material.

A28. The system of any of paragraphs A1-A27, wherein the layup surface does not translate along the support surface edge during receipt of the strip of composite material.

A29. The system of any of paragraphs A1-A28, wherein the layup surface is located vertically below the support surface, or the first support surface, during receipt of the strip of composite material.

A30. The system of any of paragraphs A1-A29, wherein the system includes the sheet of composite material.

A31. The system of any of paragraphs A1-A30, wherein the system includes the strip of composite material.

A32. The system of any of paragraphs A1-A31, wherein the sheet of composite material includes at least one of:
(i) at least 1, at least 2, at least 3, or at least 4 plies of composite material; and
(ii) at most 10, at most 8, at most 5, at most 4, at most 3, or at most 2 plies of composite material.

A33. The system of any of paragraphs A1-A32, wherein the sheet of composite material includes a plurality of lengths of reinforcing fiber and a resin material.

A34. The system of paragraph A33, wherein the plurality of lengths of reinforcing fiber is formed from at least one of carbon, titanium, aluminum, a glass, and a metal.

A35. The system of any of paragraphs A33-A34, wherein the resin material includes at least one of an epoxy and a polymeric material.

A36. The system of any of paragraphs A1-A35, wherein the sheet of composite material includes four plies of composite material, including a first ply, a second ply, a third ply, and a fourth ply.

A37. The system of paragraph A36, wherein the first ply includes a plurality of first lengths of reinforcing fiber that is oriented at a zero degree angle with respect to the support surface edge.

A38. The system of any of paragraphs A36-A37, wherein the second ply includes a plurality of second lengths of reinforcing fiber that is oriented at a 45 degree angle with respect to the support surface edge.

A39. The system of any of paragraphs A36-A38, wherein the third ply includes a plurality of third lengths of reinforcing fiber that is oriented at a 135 degree angle with respect to the support surface edge.

A40. The system of any of paragraphs A36-A39, wherein the fourth ply includes a plurality of fourth lengths of reinforcing fiber that is oriented at a zero degree angle with respect to the support surface edge.

A41. The system of any of paragraphs A36-A40, wherein the second ply and the third ply are located between the first ply and the fourth ply.

A42. The system of any of paragraphs A1-A41, wherein the system further includes a controller programmed to automatically control the operation of the system.

A43. The system of paragraph A42, wherein the controller is programmed to control the operation of the sheet-locating structure to regulate a width of the second portion of the sheet of composite material that extends past the support surface edge to a preselected width.

A44. The system of any of paragraphs A42-A43, wherein the controller is programmed to control the operation of the separation device during separation of the strip of composite material from the sheet of composite material.

A45. The system of any of paragraphs A42-A44, wherein the controller is programmed to control the conveyance structure to selectively translate a/the second support surface and the separation device along the support surface edge.

A46. The system of any of paragraphs A42-A45, wherein the system further includes a strip-detection structure that is configured to detect a location of the strip of composite material on the layup surface, optionally concurrently with separation of the strip of composite material from the sheet of composite material.

A47. The system of paragraph A46, wherein the controller is configured to receive a location indication signal from the strip-detection structure.

A48. The system of paragraph A47, wherein the system further includes a strip location-adjusting structure that is configured to adjust a location of the strip of composite material on the layup surface.

A49. The system of paragraph A48, wherein the strip location-adjusting structure is configured to adjust the location of the strip of composite material based, at least in part, on the location indication signal.

A50. The system of any of paragraphs A48-A49, wherein the strip location-adjusting structure is configured to translate the layup surface relative to the support surface, or the first support surface, to adjust the location of the strip of composite material on the layup surface.

A51. The system of any of paragraphs A42-A50, wherein the system further includes a strip width-adjusting structure configured to adjust a width of the strip of composite material.

A52. The system of paragraph A51, wherein the strip width-adjusting structure is configured to adjust the width of the strip of composite material concurrently with separation of the strip of composite material from the sheet of composite material.

A53. The system of any of paragraphs A51-A52, wherein the strip width-adjusting structure is configured to translate the separation device and a/the second support surface relative to the support surface, or the first support surface, to adjust the width of the strip of composite material.

A54. The system of any of paragraphs A51-A53, wherein the controller is configured to control the operation of the strip width-adjusting structure.

A55. The system of any of paragraphs A42-A54, wherein the controller is configured to perform the method of any of paragraphs B1-B32.

A56. The system of any of paragraphs A1-A55, wherein the system further includes a compaction structure configured to compact the strip of composite material on the layup surface.

A57. The system of paragraph A56, wherein the compaction structure includes a compaction roller.

A58. The system of any of paragraphs A56-A57, wherein the compaction structure is configured to compact the strip of composite material concurrently with separation of the strip of composite material from the sheet of composite material.

A59. The system of any of paragraphs A56-A58, wherein the compaction structure is operatively coupled to, and configured to translate with, a/the second support surface and the separation device.

A59.1 The system of any of paragraphs A56-A59, wherein the compaction structure includes a height adjustment mechanism configured to adjust a height of the layup surface relative to a/the second support surface.

A59.1.1 The system of paragraph A59.1, wherein the height adjustment mechanism is configured to adjust the height of the layup surface relative to a/the second support surface based, at least in part, on a height of a partially completed radius filler that is positioned on the layup surface.

A59.1.1.1 The system of any of paragraphs A59.1-A59.1.1, wherein the height adjustment mechanism is configured to maintain a constant, or at least substantially constant, distance between a top surface of a/the partially completed radius filler and a/the second support surface.

A59.1.1.2 The system of any of paragraphs A59.1.1-A59.1.1.1, wherein the height adjustment mechanism includes a height detector configured to at least one of:
(i) detect the height of the partially completed radius filler; and
(ii) detect the distance between the top surface of the partially completed radius filler and a/the second support surface.

A60. The system of any of paragraphs A1-A59, wherein the system further includes a stabilizing roller configured to retain the first portion of the sheet of composite material (at least substantially) fixed relative to the support surface, or the first support surface, during separation of the strip of composite material from the sheet of composite material.

A61. The system of any of paragraphs A1-A60, wherein the system is configured to sequentially locate a plurality of strips of composite material on the layup surface to form a stack of strips of composite material that defines the radius filler.

A62. The system of paragraph A61, wherein a width of each of the plurality of strips of composite material progressively decreases within the stack of strips of composite material.

A63. The system of any of paragraphs A1-A62, wherein the separation device is a first separation device, and further wherein the system includes:

(i) a third support surface that is spaced-apart from the support surface, or the first support surface, and also from the second support surface, wherein a/the second support surface is configured to support a first fraction of the second portion of the sheet of composite material, and further wherein the third support surface is configured to support a second fraction of the second portion of the sheet of composite material, optionally wherein a distance between the support surface, or the first support surface, and a/the second support surface is less than a distance between the support surface, or the first support surface, and the third support surface, optionally wherein the support surface, or the first support surface, a/the second support surface, and the third support surface are coplanar, or at least substantially coplanar, and further optionally wherein the first fraction of the second portion of the sheet of composite material is proximal the support surface, or the first support surface, relative to the second fraction of the second portion of the sheet of composite material;

(ii) a second separation device configured to separate the second fraction of the second portion of the sheet of composite material from the first fraction of the second portion of the sheet of composite material, optionally wherein the first fraction of the second portion of the sheet of composite material defines the strip of composite material.

A64. The system of paragraph A63, wherein the second separation device includes any suitable structure of the separation device of any of paragraphs A16-A21.1.5.

A65. The system of any of paragraphs A63-A64, wherein the system further includes a scrap bin configured to receive the second fraction of the second portion of the sheet of composite material subsequent to separation of the second fraction of the second portion of the sheet of composite material from the first fraction of the second portion of the sheet of composite material.

A66. The system of paragraph A65, wherein the system further includes a scrap transition surface configured to direct the second fraction of the second portion of the sheet of composite material into the scrap bin.

A67. The system of any of paragraphs A63-A66, wherein a/the second support surface, the third support surface, the first separation device, and the second separation device are operatively coupled together and configured to operatively translate along the support surface edge, via the conveyance structure, to at least partially concurrently define both the first fraction of the second portion of the sheet of composite material and the second fraction of the second portion of the sheet of composite material.

A68. The system of any of paragraphs A1-A67, wherein a/the second support surface and the separation device are operatively coupled to one another to form a separation assembly, and further wherein the system includes:

(i) a floating mount configured to permit motion of the separation assembly relative to the conveyance structure in a direction that is perpendicular, or at least substantially perpendicular, to the layup surface; and (ii) an indexing structure configured to operatively engage both the separation assembly and the layup surface to maintain a fixed, or at least substantially fixed, relative orientation between the separation assembly and the layup surface in the direction that is perpendicular, or at least substantially perpendicular, to the layup surface.

A69. The system of paragraph A68, wherein the indexing structure includes:

(i) a first indexing structure configured to engage against a first edge of the layup surface; and (ii) a second indexing structure configured to engage against a second edge of the layup surface, wherein the second edge of the layup surface is opposed to the first edge of the layup surface.

A70. The system of paragraph A69, wherein at least one of:

(i) the first indexing structure includes a first indexing roller; and (ii) the second indexing structure includes a second indexing roller.

A71. The system of any of paragraphs A1-A70, wherein the system further includes at least one feed roller configured to convey the strip of composite material from the separation device and toward the layup surface.

A72. The system of paragraph A71, wherein the at least one feed roller includes a pair of opposed feed rollers configured to roll against opposed sides of the strip of composite material to convey the strip of composite material from the separation device and toward the layup surface.

A73. The system of any of paragraphs A71-A72, wherein the at least one feed roller includes at least one motorized feed roller.

A74. The system of paragraph A73, wherein the system further includes a feedback mechanism configured to vary a rotational velocity of the at least one motorized feed roller based, at least in part, on a linear velocity at which the conveyance structure operatively translates a/the second support surface and the separation device along the support surface edge.

A75. The system of paragraph A74, wherein the feedback mechanism is configured to decrease a potential for tearing of the strip of composite material during formation thereof.

B1. A method of forming a radius filler for a composite structure, the method comprising:

locating a sheet of composite material on a support surface, or a first support surface, that terminates at a support surface edge;

translating the sheet of composite material such that a first portion of the sheet of composite material is supported by the support surface, or the first support surface, and a second portion of the sheet of composite material extends past the support surface edge;

optionally supporting the second portion of the sheet of composite material with a second support surface that is adjacent to the support surface, or the first support surface;

separating the second portion of the sheet of composite material from the first portion of the sheet of composite material with a separation device to form a strip of composite material;

conveying the strip of composite material onto a layup surface, wherein the conveying is concurrent with the separating; and repeating the translating, the supporting, the separating, and the conveying to sequentially locate a plurality of strips of composite material on the layup surface to form a stack of strips of composite material that defines the radius filler.

B2. The method of paragraph B1, wherein the locating includes forming the sheet of composite material on the support surface, or the first support surface.

B3. The method of any of paragraphs B1-B2, wherein the locating includes locating a previously formed sheet of composite material on the support surface, or the first support surface.

B4. The method of any of paragraphs B1-B3, wherein the support surface, or the first support surface, is defined by a charge-advance belt, and further wherein the translating includes moving the charge-advance belt.

B5. The method of any of paragraphs B1-B4, wherein the translating includes cantilevering the second portion of the sheet of composite material over the support surface edge.

B6. The method of any of paragraphs B1-B5, wherein the translating includes translating such that the second portion of the sheet of composite material has a predetermined second portion width.

B7. The method of any of paragraphs B1-B6, wherein the translating includes translating such that the strip of composite material that is formed during the separating has a predetermined strip width.

B8. The method of any of paragraphs B1-B7, wherein the separating includes conveying a/the second support surface and/or the separation device along the support surface edge.

B9. The method of any of paragraphs B1-B8, wherein the separating includes extending the separation device completely through the sheet of composite material.

B9.1 The method of any of paragraphs B1-B9, wherein the separation device includes a circular blade and an opposed cylindrical anvil that defines a cylindrical anvil surface, and further wherein the separating includes compressing the sheet of composite material between the circular blade and the cylindrical anvil surface.

B9.1.1 The method of paragraph B9.1, wherein the circular blade and the cylindrical anvil surface define a contact region therebetween, and further wherein the separating includes extending the sheet of composite material into the contact region.

B9.1.2 The method of any of paragraphs B9.1-B9.1.1, wherein the separating further includes:

(i) operatively rotating the circular blade, optionally relative to the sheet of composite material, with a blade drive assembly; and (ii) operatively rotating the cylindrical anvil, optionally relative to the sheet of composite material, with an anvil drive assembly.

B10. The method of any of paragraphs B1-B9.1.2, wherein the conveying includes translating the strip of composite material across a/the second support surface and onto the layup surface.

B11. The method of paragraph B10, wherein the conveying further includes translating the strip of composite material across a transition surface that extends between a/the second support surface and the layup surface.

B12. The method of any of paragraphs B1-B11, wherein the method further includes detecting a location of the strip of composite material on the layup surface.

B13. The method of any of paragraphs B1-B12, wherein the conveying includes regulating a/the location of the strip of composite material on the layup surface.

B14. The method of paragraph B13, wherein the regulating the location includes moving the layup surface relative to the support surface, or the first support surface, such that the strip of composite material is placed at a predetermined location on the layup surface as a result of the conveying.

B15. The method of any of paragraphs B1-B14, wherein the method further includes compacting the strip of composite material on the layup surface with a compaction structure.

B16. The method of paragraph B15, wherein the compacting is concurrent with the separating.

B17. The method of any of paragraphs B15-B16, wherein the compacting is concurrent with the conveying.

B17.1 The method of any of paragraphs B15-B17, wherein the compacting includes active controlling a compaction force applied to the strip of composite material.

B17.1.1 The method of paragraph B17.1, wherein the actively controlling includes adjusting a height of the layup surface relative to a/the second support surface.

B17.1.2 The method of paragraph B17.1.1, wherein the adjusting the height of the layup surface includes maintaining a constant, or at least substantially constant, distance between a top surface of a partially completed radius filler and a/the second support surface.

B18. The method of any of paragraphs B1-B17.1.2, wherein the method further includes detecting a width of the strip of composite material during the separating.

B19. The method of any of paragraphs B1-B18, wherein the method further includes detecting a cross-sectional area of the stack of strips of composite material.

B20. The method of any of paragraphs B1-B19, wherein the method further includes regulating a/the width of the strip of composite material.

B21. The method of paragraph B20, wherein the regulating the width of the strip of composite material includes regulating such that the strip of composite material has a predetermined width along a length of the strip of composite material.

B22. The method of any of paragraphs B20-B21, wherein the regulating the width of the strip of composite material includes regulating such that the strip of composite material has a predetermined width profile along a/the length of the strip of composite material.

B23. The method of any of paragraphs B20-B22, wherein the regulating the width of the strip of composite material includes regulating such that the stack of strips of composite material has a predetermined cross-sectional area along a length of the stack of strips of composite material.

B24. The method of any of paragraphs B20-B23, wherein the regulating the width of the strip of composite material includes regulating such that the stack of strips of composite material has a predetermined cross-sectional area variation along a/the length of the stack of strips of composite material.

B25. The method of any of paragraphs B20-B24, wherein the regulating the width of the strip of composite material is based, at least in part, on a detected width of the strip of composite material.

B26. The method of any of paragraphs B20-B25, wherein the regulating the width of the strip of composite material is based, at least in part, on a detected cross-sectional area of the stack of strips of composite material.

B27. The method of any of paragraphs B20-B26, wherein the regulating the width of the strip of composite material is concurrent with the separating.

B28. The method of any of paragraphs B20-B27, wherein the regulating the width of the strip of composite material is concurrent with the conveying.

B29. The method of any of paragraphs B1-B28, wherein the separation device is a first separation device, wherein the supporting the second portion of the sheet of composite material includes supporting a first fraction of the second portion of the sheet of composite material with a/the second support surface, and further wherein the method includes:

at least partially concurrently with the supporting the first fraction of the second portion of the sheet of composite material with a/the second support surface, supporting a second fraction of the second portion of the sheet of composite material with a third support surface;

at least partially concurrently with the separating the first fraction of the second portion of the sheet of composite material from the first portion of the sheet of composite material, separating the second fraction of the second portion of the sheet of composite material from the first portion of the sheet of composite material.

B30. The method of paragraph B29, wherein the method further includes directing the second fraction of the second portion of the sheet of composite material into a scrap bin that is distinct from the layup surface.

B31. The method of any of paragraphs B1-B30, wherein a/the second support surface and the separation device are operatively coupled to one another to form a separation assembly, and further wherein, the method includes maintaining a fixed, or at least substantially fixed, relative orientation between the separation assembly and a centerline of the layup surface during the separating.

B32. The method of paragraph B31, wherein the maintaining includes operatively translating the separation assembly in a direction that is perpendicular, or at least substantially perpendicular, to the layup surface, or to a longitudinal length of the layup surface.

B33. The method of any of paragraphs B1-B32, wherein the method further includes maintaining a tension on the strip of composite material with at least one motorized feed roller.

B34. The method of paragraph B33, wherein the maintaining the tension includes varying a rotational frequency of the at least one motorized feed roller based, at least in part, on a rate at which the second portion of the sheet of composite material is separated from the first portion of the sheet of composite material during the separating.

B35. The method of any of paragraphs B1-B34, wherein the repeating includes forming a plurality of scraps of composite material and forming the plurality of strips of composite material, wherein the plurality of scraps of composite material is not conveyed onto the layup surface.

B36. The method of paragraph B35, wherein each scrap of composite material of the plurality of scraps of composite material is formed intermediate to two strips of composite material of the plurality of strips of composite material, and further wherein the forming the plurality of scraps of composite material includes defining a desired edge profile on each strip of composite material of the plurality of strips of composite material.

B37. The method of any of paragraphs B1-B36, wherein a/the second support surface and the separation device are operatively coupled to one another and configured to translate together, and further wherein the repeating includes repeatedly conveying a/the second support surface and the separation device along the support surface edge to form the plurality of strips of composite material.

B38. The method of paragraph B37, wherein the translating the sheet of composite material and the conveying the strip of composite material are interleaved with the repeatedly conveying.

B39. The method of any of paragraphs B1-B38 performed utilizing any suitable structure of any of the systems of any of paragraphs A1-A75.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A system for forming a radius filler for a composite structure, the system comprising:
   a sheet-locating structure having a support surface configured to support a first portion of a sheet of composite material, wherein the support surface has a support surface edge, and further wherein the sheet-locating structure is configured to selectively extend a second portion of the sheet of composite material past the support surface edge;
   a separation device configured to separate the second portion of the sheet of composite material from the first portion of the sheet of composite material to form a strip of composite material;
   a conveyance structure configured to operatively translate the separation device along the support surface edge of the support surface to form the strip of composite material; and a layup surface configured to receive the strip of composite material subsequent to the strip of composite material being separated from the sheet of composite material.

2. The system of claim 1, wherein the support surface is a first support surface, and further wherein the system includes a second support surface that is adjacent the support surface edge of the support surface, or the first support surface, wherein the first support surface, and the second support surface define a gap therebetween, and further wherein the second support surface is configured to support the second portion of the sheet of composite material.

3. The system of claim 2, wherein the conveyance structure further is configured to operatively translate the second support surface along the support surface edge of the support surface.

4. The system of claim 2, wherein the layup surface is configured to receive the strip of composite material from the second support surface.

5. The system of claim 2, wherein the separation device is a first separation device, and further wherein the system includes:
  (i) a third support surface that is spaced-apart from the first support surface and also from the second support surface, wherein the second support surface is configured to support a first fraction of the second portion of the sheet of composite material, and further wherein the third support surface is configured to support a second fraction of the second portion of the sheet of composite material; and
  (ii) a second separation device configured to separate the second fraction of the second portion of the sheet of composite material from the first fraction of the second portion of the sheet of composite material.

6. The system of claim 5, wherein the first fraction of the second portion of the sheet of composite material defines the strip of composite material.

7. The system of claim 5, wherein a distance between the first support surface and the second support surface is less than a distance between the first support surface and the third support surface.

8. The system of claim 5, wherein the system further includes a scrap bin configured to receive the second fraction of the second portion of the sheet of composite material subsequent to separation of the second fraction of the second portion of the sheet of composite material from the first fraction of the second portion of the sheet of composite material.

9. The system of claim 5, wherein the second support surface, the third support surface, the first separation device, and the second separation device are operatively coupled together and configured to operatively translate along the support surface edge, via the conveyance structure, to at least partially concurrently define both the first fraction of the second portion of the sheet of composite material and the second fraction of the second portion of the sheet of composite material.

10. The system of claim 1, wherein the separation device includes a circular blade and an opposed cylindrical anvil, which defines a cylindrical anvil surface.

11. The system of claim 10, wherein the circular blade and the cylindrical anvil surface define a contact region therebetween, and further wherein the system is configured to extend the sheet of composite material into the contact region to separate the second portion of the sheet of composite material from the first portion of the sheet of composite material and form the strip of composite material.

12. The system of claim 10, wherein the cylindrical anvil surface is a sacrificial cylindrical anvil surface, and further wherein the circular blade extends past the cylindrical anvil surface and at least partially into the opposed cylindrical anvil.

13. The system of claim 10, wherein the separation device further includes at least one of:
  (i) a blade drive assembly configured to operatively rotate the circular blade relative to the sheet of composite material; and
  (ii) an anvil drive assembly configured to operatively rotate the cylindrical anvil relative to the sheet of composite material.

14. The system of claim 1, wherein the system further includes a compaction structure configured to compact the strip of composite material on the layup surface, wherein the compaction structure includes a height adjustment mechanism configured to adjust a height of the layup surface.

15. The system of claim 1, wherein a second support surface and the separation device are operatively coupled to one another to form a separation assembly, and further wherein the system includes:
  (i) a floating mount configured to permit motion of the separation assembly relative to the conveyance structure in a direction that is at least substantially perpendicular to the layup surface; and
  (ii) an indexing structure configured to operatively engage both the separation assembly and the layup surface to maintain an at least substantially fixed relative orientation between the separation assembly and the layup surface in the direction that is at least substantially perpendicular to the layup surface.

16. The system of claim 15, wherein the indexing structure includes:
  (i) a first indexing structure configured to engage against a first edge of the layup surface; and
  (ii) a second indexing structure configured to engage against a second edge of the layup surface, wherein the second edge of the layup surface is opposed to the first edge of the layup surface.

17. The system of claim 1, wherein the system further includes at least one feed roller configured to convey the strip of composite material from the separation device and toward the layup surface.

18. The system of claim 17, wherein the at least one feed roller includes a pair of opposed feed rollers configured to roll against opposed sides of the strip of composite material to convey the strip of composite material from the separation device and toward the layup surface.

19. The system of claim 17, wherein the at least one feed roller includes at least one motorized feed roller, and further wherein the system includes a feedback mechanism configured to vary a rotational velocity of the at least one motorized feed roller based, at least in part, on a linear velocity at which the conveyance structure operatively translates the separation device along the support surface edge.

20. A method of forming a radius filler for a composite structure, the method comprising:
  locating a sheet of composite material on a support surface that terminates at a support surface edge;
  translating the sheet of composite material such that a first portion of the sheet of composite material is supported by the support surface and a second portion of the sheet of composite material extends past the support surface edge;

separating the second portion of the sheet of composite material from the first portion of the sheet of composite material with a separation device to form a strip of composite material;

conveying the strip of composite material onto a layup surface, wherein the conveying is concurrent with the separating; and repeating the translating, the separating, and the conveying to sequentially locate a plurality of strips of composite material on the layup surface to form a stack of strips of composite material that defines the radius filler.

\* \* \* \* \*